(12) United States Patent
Cox et al.

(10) Patent No.: US 9,720,242 B2
(45) Date of Patent: Aug. 1, 2017

(54) LASER SYSTEM WITH PARTIAL REFLECTOR

(71) Applicant: Laser Quantum Ltd, Stockport (GB)

(72) Inventors: Alan Cox, Cheshire (GB); Jean-Charles Cotteverte, Heald Green (GB)

(73) Assignee: LASER QUANTUM INC., San Jose, CA (US)

( * ) Notice: Subject to any disclaimer, the term of this patent is extended or adjusted under 35 U.S.C. 154(b) by 0 days.

(21) Appl. No.: 14/809,931

(22) Filed: Jul. 27, 2015

(65) Prior Publication Data

US 2016/0033775 A1 Feb. 4, 2016

(30) Foreign Application Priority Data

Jul. 29, 2014 (GB) .................................. 1413424.1

(51) Int. Cl.
| | |
|---|---|
| *G02B 27/10* | (2006.01) |
| *G02B 27/14* | (2006.01) |
| *H01S 3/00* | (2006.01) |
| *G02B 27/28* | (2006.01) |
| *H01S 3/13* | (2006.01) |

(52) U.S. Cl.
CPC ......... *G02B 27/108* (2013.01); *G02B 27/283* (2013.01); *H01S 3/1306* (2013.01); *H01S 3/005* (2013.01)

(58) Field of Classification Search
CPC .. G02B 27/108; G02B 27/144; G02B 27/283; H01S 3/005; H01S 3/13; H01S 3/1305; H01S 3/1306; H01S 5/068

(Continued)

(56) References Cited

U.S. PATENT DOCUMENTS

| 5,111,468 A | 5/1992 | Kozlovsky et al. |
| 5,177,755 A | 1/1993 | Johnson |

(Continued)

FOREIGN PATENT DOCUMENTS

| EP | 0850501 | 7/1998 |
| EP | 2747219 | 6/2014 |

(Continued)

OTHER PUBLICATIONS

Machine language translation of applicant's cited JP 2006-237530 from https://dossier1.j-platpat.inpit.go.jp/tri/all/odse/ODSE_GM101_Top.action, on Sep. 1, 2016.*

(Continued)

*Primary Examiner* — Frank Font
(74) *Attorney, Agent, or Firm* — Faegre Baker Daniels LLP

(57) ABSTRACT

A laser system comprising a laser configured to emit a laser beam wherein the laser beam is linearly polarized in a polarization plane and an optical assembly comprising a partial reflector having a refractive index and comprising a partially reflective surface. The partially reflective surface is arranged to receive the laser beam at an angle of incidence which lies in a plane of incidence and reflect a portion of the laser beam such that the reflected portion is output from the optical assembly. The partially reflective surface is arranged such that the plane of incidence forms a polarization angle with the polarization plane of the laser beam and the laser beam includes a p-polarized component and an s-polarized component. The angle of incidence and the polarization angle are arranged such that a fraction of the laser beam which is output from the optical assembly, following reflection from the partially reflective surface, is substantially invariant with changes in at least one of the temperature of the partial reflector and a thickness of a contamination layer (Continued)

disposed on the partially reflective surface. The partially reflective surface is arranged to reflect a fraction of the laser beam which is greater than or equal to approximately 0.5% of the laser beam which is incident on the partially reflective surface.

17 Claims, 7 Drawing Sheets

(58) Field of Classification Search
USPC ...... 359/485.02; 372/29.011, 29.021, 31, 99, 372/106
See application file for complete search history.

(56) References Cited

U.S. PATENT DOCUMENTS

| | | | |
|---|---|---|---|
| 6,151,343 A | 11/2000 | Jurgensen | |
| 6,327,294 B1* | 12/2001 | Kojima | H01S 3/025 372/101 |
| 2006/0215716 A1 | 9/2006 | Luo et al. | |
| 2008/0144679 A1* | 6/2008 | Miyamae | G02B 6/4204 372/31 |
| 2015/0136945 A1* | 5/2015 | Babic | G02B 27/108 250/205 |

FOREIGN PATENT DOCUMENTS

| | | | | |
|---|---|---|---|---|
| JP | 2006-237530 A | * | 9/2006 | ............ H01S 3/131 |
| JP | 2006237530 | | 9/2006 | |

OTHER PUBLICATIONS

UK Intellectual Property Office, Combined Search and Examination Report in No. GB1413424/1, issued Jan. 28, 2015, 7 pages.
Search Report of the Intellectual Property Office in Application No. 881222843.3, Mar. 22, 2013, 3 pages.

* cited by examiner

LASER SYSTEM WITH PARTIAL REFLECTOR

CROSS REFERENCE TO RELATED APPLICATION

This application claims priority to Application No. GB 1413424.1, filed Jul. 29, 2014, the disclosure of which is hereby expressly incorporated by reference herein in its entirety.

FIELD

The present invention relates to a laser system. In particular the present invention relates to a laser system including a partial reflector suitable for reflecting a portion of a laser beam.

In some applications of a laser it may be desirable to measure one or more properties of a laser beam which is emitted from the laser. In order to measure one or more properties of a laser beam a partial reflector may be positioned in the path of the laser beam. The partial reflector may direct a portion of the laser beam to one or more sensors which may be configured to measure one or more properties of the laser beam, whilst allowing a remainder of the laser beam to pass through the partial reflector.

It is an object of the present invention to provide a partial reflector which obviates or mitigates a disadvantage associated with known partial reflectors.

SUMMARY OF THE INVENTION

According to a first aspect there is provided a laser system comprising a laser configured to emit a laser beam wherein the laser beam is linearly polarized in a polarization plane and an optical assembly comprising a partial reflector having a refractive index and comprising a partially reflective surface, wherein the partially reflective surface is arranged to receive the laser beam at an angle of incidence which lies in a plane of incidence and reflect a portion of the laser beam such that the reflected portion is output from the optical assembly, the partially reflective surface is arranged such that the plane of incidence forms a polarization angle with the polarization plane of the laser beam and the laser beam includes a p-polarized component and an s-polarized component, the angle of incidence and the polarization angle are arranged such that a fraction of the laser beam which is output from the optical assembly, following reflection from the partially reflective surface, is substantially invariant with changes in at least one environmental factor and the partially reflective surface is arranged to reflect a fraction of the laser beam which is greater than or equal to approximately 0.5% of the laser beam which is incident on the partially reflective surface.

The fraction of the laser beam which is output from the optical assembly being substantially invariant with changes in at least one environmental factor means that the power of the fraction of the laser beam which is output from the optical assembly is substantially invariant with changes in at least one environmental factor. This advantageously allows the power of the laser beam to be determined by measuring the power of the fraction of the laser beam which is output from the optical assembly.

Factors such as changes in temperature and/or contamination do not substantially affect the determination of the power of the laser beam. The determined power of the laser beam may be used as part of a feedback system in order to control the power of the laser beam.

The partially reflective surface may be arranged to reflect a fraction of the laser beam which is greater than or equal to approximately 1% of the laser beam which is incident on the partially reflective surface.

The angle of incidence and the polarization angle are arranged such that in the event of a change in at least one environmental factor a resulting change in an amount of p-polarized radiation which is output from the optical assembly is substantially equal and opposite in sign to a resulting change in an amount of s-polarized radiation which is output from the optical assembly.

The at least one environmental factor may comprise temperature which affects the refractive index of the partial reflector.

The at least one environmental factor may comprise a thickness of a contamination layer which is disposed on the partially reflective surface.

The polarization angle may be greater than or equal to about 10 degrees.

The angle of incidence may be greater than or equal to about 3 degrees more than Brewster's angle.

The laser system may further comprise a sensor arranged to receive the fraction of the laser beam which is output from the optical assembly and measure the power of the fraction which is output from the optical assembly.

The laser system may further comprise a feedback system configured to control the power of the laser beam which is emitted from the laser according to the measurement of the power of the fraction of the laser beam which is output from the optical assembly.

The laser system may further comprise a polarizer arranged in the path of the laser beam before the laser beam is incident on the partial reflector and configured to only transmit radiation having a polarization which lies in the polarization plane.

The polarizer may comprise a thin film polarizer arranged immediately upstream of the partial reflector such that the laser beam does not pass through any element other than a gas in its path between the thin film polarizer and the partial reflector.

The partial reflector may comprise a second surface, wherein the second surface is not parallel with the partially reflective surface.

The partial reflector may comprise a second surface, wherein a spatial separation between the partially reflective surface and the second surface is such that the fraction of the laser beam which is reflected from the partially reflective surface is sufficiently spatially separated from a fraction of the laser beam which is reflected from the second surface such that the fraction of the laser beam which is reflected from the partially reflective surface may be measured independently from a fraction of the laser beam which is reflected from the second surface.

The laser system may further comprise an optical filter arranged in the path of the laser beam before or after the laser beam is incident on the partial reflector, wherein the optical filter is configured to only transmit radiation in a desired wavelength range.

The partially reflective surface may be coated with an optical coating.

The partial reflector may comprise fused silica or borosilicate crown (BK) glass, such as BK7 glass available from Schott AG.

The angle of incidence may be greater than about 54 degrees. The angle of incidence may be less than about 56 degrees The polarization angle may be greater than about 8 degrees. The polarization angle may be less than about 12 degrees.

The angle of incidence may be greater than about 56 degrees. The angle of incidence may be less than about 59 degrees.

The polarization angle may be greater than about 10 degrees. The polarization angle may be less than about 15 degrees.

The partial reflector may comprise yttrium aluminium garnet (YAG).

The angle of incidence may be greater than about 62 degrees. The angle of incidence may be less than about 64 degrees.

The polarization angle may be greater than about 7 degrees. The polarization angle may be less than about 11 degrees.

The partially reflective surface may be sealed from an external environment.

The optical assembly may further comprise an optical element configured to receive the laser beam and transmit a portion of the laser beam to be incident on the partially reflective surface.

The optical element may be in contact with the partially reflective surface so as to seal the partially reflective surface from the external environment.

The optical element and the partial reflector may have different refractive indices.

The optical element and the partial reflector may form a sealed chamber. The partially reflective surface may be positioned in the sealed chamber and may be arranged to receive the transmitted laser beam from the optical element and reflect a portion of the laser beam out of the sealed chamber such that it is output from the optical assembly.

The partially reflective surface and the optical element may be arranged relative to each other such that when the optical assembly is oriented such the optical element is substantially perpendicular to the polarization plane of the laser beam and the laser beam is incident on the optical element substantially at Brewster's angle, the angle of incidence and the polarization angle are arranged such that a fraction of the laser beam which is output from the optical assembly, following reflection from the partially reflective surface, is substantially invariant with changes in the at least one environmental factor.

The angle of incidence and the polarization angle may be such that a fraction of the transmitted laser beam which is output from the optical assembly is substantially invariant with changes in the refractive index of the optical element.

The angle of incidence and the polarization angle may be such that a fraction of the transmitted laser beam which is output from the optical assembly is substantially invariant with changes in the thickness of a contamination layer which is disposed on the optical element.

The optical element may be arranged to receive the fraction of the laser beam which is reflected from the partially reflective surface and transmit at least some of the reflected fraction out of the sealed chamber such that it is output from the optical assembly.

The laser system may further comprise a second optical element arranged to receive the fraction of the laser beam which is reflected from the partially reflective surface and transmit at least some of the reflected fraction out of the sealed chamber such that it is output from the optical assembly.

The sealed chamber may have a volume of less than about 1 cubic centimeter.

Internal surfaces of the sealed chamber may have a total surface area of less than about 5 cm$^2$.

The laser system may further comprise a thin-film polarizer disposed on a surface of the optical element.

According to a second aspect there is provided a laser system comprising a laser configured to emit a laser beam wherein the laser beam is linearly polarized in a polarization plane and an optical assembly comprising an optical element configured to receive the laser beam and transmit at least a portion of the laser beam and a partial reflector having a refractive index and comprising a partially reflective surface which is sealed from an external environment, wherein the partially reflective surface is arranged to receive the transmitted laser beam at an angle of incidence which lies in a plane of incidence and reflect a portion of the laser beam out of the optical assembly, the partially reflective surface is arranged such that the plane of incidence forms a polarization angle with the polarization plane of the transmitted laser beam and the laser beam includes a p-polarized component and an s-polarized component and the angle of incidence and the polarization angle are arranged such that a fraction of the laser beam which is reflected out of the optical assembly is substantially invariant with changes in at least one environmental factor.

The angle of incidence and the polarization angle may be arranged such that in the event of a change in at least one environmental factor a resulting change in an amount of p-polarized radiation which is reflected out of the sealed chamber is substantially equal and opposite in sign to a resulting change in an amount of s-polarized radiation which is reflected out of the sealed chamber.

The at least one environmental factor may comprise a thickness of a contamination layer which is disposed on the partially reflective surface.

The at least one environmental factor may comprise temperature which affects the refractive index of the partial reflector.

The partially reflective surface and the optical element may be arranged relative to each other such that when the optical assembly is oriented such that the optical element is substantially perpendicular to the polarization plane of the laser beam and the laser beam is incident on the optical element substantially at Brewster's angle, the angle of incidence and the polarization angle are arranged such that a fraction of the laser beam which is reflected out of the sealed chamber is substantially invariant with changes in the at least one environmental factor.

The laser system may further comprise a thin-film polarizer disposed on a surface of the optical element.

The partial reflector further may comprise a second surface and wherein the second surface is not parallel with the partially reflective surface.

The optical element may be in contact with the partially reflective surface so as to seal the partially reflective surface from the external environment.

The partial reflector and the optical element may have difference refractive indices.

The optical element and the partial reflector may form a sealed chamber wherein the partially reflective surface is positioned in the sealed chamber and is arranged to receive the transmitted laser beam from the optical element and reflect a portion of the laser beam out of the sealed chamber such that it is output from the optical assembly.

The sealed chamber may have a volume of less than about 1 cubic centimeter.

The internal surfaces of the sealed chamber may have a total surface area of less than about 5 cm$^2$.

According to a third aspect there is provided a method of reflecting a fraction of a laser beam comprising directing a laser beam to be incident on an optical assembly comprising a partial reflector having a refractive index and comprising a partially reflective surface, wherein the laser beam is linearly polarized in a polarization plane, arranging the partially reflective surface to receive the laser beam such that the laser beam is incident on the partially reflective surface with an angle of incidence which lies in a plane of incidence and such that the plane of incidence forms a polarization angle with the polarization plane of the laser beam and the laser beam includes a p-polarized component and an s-polarized component and such that the angle of incidence and the polarization angle are arranged such that a fraction of the laser beam which is output from the optical assembly, following reflection from the partially reflective surface, is substantially invariant with changes in at least one environmental factor and such that the partially reflective surface reflects a fraction of the laser beam which is greater than or equal to approximately 0.5% of the laser beam which is incident on the partially reflective surface.

The angle of incidence and the polarization angle may be such that in the event of a change in at least one environmental factor a resulting change in an amount of p-polarized radiation which is output from the optical assembly is substantially equal and opposite in sign to a resulting change in an amount of s-polarized radiation which is output from the optical assembly.

The polarization angle may be greater than or equal to about 10 degrees.

The angle of incidence may be greater than or equal to about 3 degrees more than Brewster's angle.

The at least one environmental factor may comprise temperature which affects the refractive index of the partial reflector.

The at least one environmental factor may comprise a thickness of a contamination layer which is disposed on the partially reflective surface.

According to a fourth aspect there is provided a method of reflecting a fraction of a laser beam comprising directing a laser beam which is linearly polarized in a polarization plane to be incident an optical assembly comprising an optical element and a partial reflector, wherein the optical element receives the laser beam and transmits at least a portion of the laser beam such that it is incident on a partially reflective surface of a partial reflector, wherein the partially reflective surface is sealed from an external environment, arranging the partially reflective surface to receive the transmitted laser beam such that the laser beam is incident on the partially reflective surface with an angle of incidence which lies in a plane of incidence and such that the plane of incidence forms a polarization angle with the polarization plane of the laser beam and the laser beam includes a p-polarized component and an s-polarized component and such that the angle of incidence and the polarization angle are arranged such that a fraction of the laser beam which is output from the optical assembly, following reflection from the partially reflective surface, is substantially invariant with changes in at least one environmental factor.

The angle of incidence and the polarization angle may be such that in the event of a change in at least one environmental factor a resulting change in an amount of p-polarized radiation which is output from the optical assembly is substantially equal and opposite in sign to a resulting change in an amount of s-polarized radiation which is output from the optical assembly.

The polarization angle may be greater than or equal to about 10 degrees.

The angle of incidence may be greater than or equal to about 3 degrees more than Brewster's angle.

The at least one environmental factor may comprise temperature which affects the refractive index of the partial reflector.

The at least one environmental factor may comprise a thickness of a contamination layer which is disposed on the partially reflective surface.

The optical element may be in contact with the partially reflective surface so as to seal the partially reflective surface from the external environment, and wherein the optical element and the partial reflector have different refractive indices.

The optical element and the partial reflector may form a sealed chamber, wherein the partially reflective surface is positioned in the sealed chamber and receives the transmitted laser beam from the optical element and reflects a portion of the laser beam out of the sealed chamber such that it is output from the optical assembly.

One or more aspects or features described in the preceding or following descriptions may be combined with one or more other aspects or features.

BRIEF DESCRIPTION OF THE DRAWINGS

Embodiments of the invention will now be described, by way of example only, with reference to the accompanying schematic drawings, in which.

DETAILED DESCRIPTION OF THE INVENTION

Figure 1:
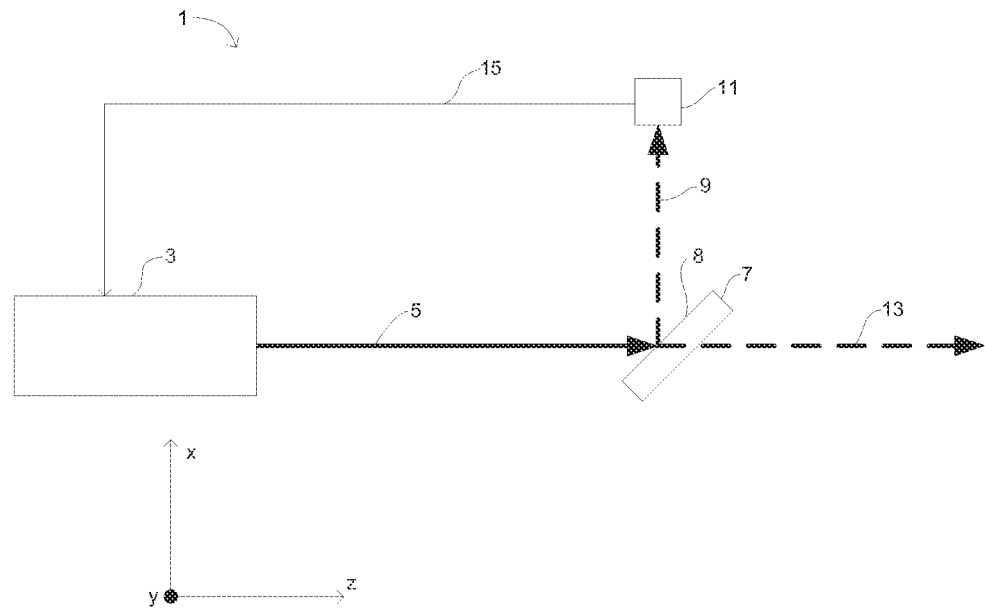
FIG. 1 is a schematic illustration of a laser system according to an embodiment of the invention.

FIG. 1 is a schematic illustration of a laser system 1. The laser system 1 comprises a laser 3 which emits a laser beam 5. The laser 3 may, for example, be a diode pumped solid state laser or may be another form of laser 3. The laser beam 5 is incident on a partial reflector 7. The partial reflector 7 comprises a partially reflective surface 8 which reflects a reflected portion 9 of the laser beam 5 towards a sensor 11 and transmits a transmitted portion 13 of the laser beam 5. The sensor 11 is configured to measure one or more properties of the reflected portion 9 of the laser beam 5. For example, the sensor 11 may be configured to measure the power of the reflected portion 9 of the laser beam 5. Also shown in FIG. 1 is a Cartesian co-ordinate system which is adhered to throughout the figures. The laser beam 5 propagates towards the partial reflector 7 in a z-direction. A y-direction extends out of the page of FIG. 1.

The partial reflector 7 typically transmits a majority of the radiation which is incident upon it and thus the power of the transmitted portion 13 represents a majority of the power of the laser beam 5 which is emitted from the laser 3. The transmitted portion 13 is used in an application of the laser beam 5. For example, the transmitted portion 13 may be used in applications such as high energy physics, holography, optical communications, DNA sequencing, pumping another laser (e.g. a titanium sapphire laser) or other applications.

In some applications of the laser beam 5 it may be desirable for the power of the transmitted portion 13 to be substantially stable with time. For example, some high precision applications of a laser beam 5 may require a laser beam 5 having a specific power which may be accurately controlled and which is stable with time. However the efficiency of a laser 3 may vary over time. For example, the efficiency of a laser 3 may vary with changes in temperature and/or other factors which may vary over time. Changes in the efficiency of a laser 3 may result in changes in the power of the laser beam 5 which is emitted from the laser 3 and will therefore reduce the stability of the power of the transmitted portion 13.

In order to improve the stability of the power of the transmitted portion 13 of the laser beam 5, the laser system 1 may include a feedback system 15. The feedback system 15 may use measurements of the power of the reflected portion 9 made by the sensor 11 in order to adjust the laser 3 so as to improve the stability of the power of the laser beam 5. For example, if the sensor 11 measures an increase in the power of the reflected portion 9 then this may indicate an increase in the power of the laser beam 5 and the feedback system 15 may reduce the power (e.g. a pumping power) which is provided to the laser 3 in order to bring about a reduction in the power of the laser beam 5. If the sensor 11 measures a decrease in the power of the reflected portion 9 then the feedback system 15 may act to increase the power which is provided to the laser 3 in order to bring about an increase in the power of the laser beam 5. An example of a feedback system 15 which may be used in accordance with embodiments of the invention is disclosed by U.S. patent application Ser. No. 14/107,269 which is herein incorporated by reference in its entirety.

A feedback system 15 may be controlled such that the laser 3 outputs a laser beam 5 having a desired power and may, for example, serve to improve the stability of the power of the laser beam 5 and the stability of the power of the transmitted portion 13. However such a feedback system 15 relies on an assumption that a fraction $f_r$ of the laser beam 5 which is reflected to form the reflected portion 9 which is directed to the sensor 11 by the partial reflector 7 is substantially constant. If this is not the case then the stability of the power of the transmitted portion 13 may be adversely affected. For example, if the properties of the partial reflector 7 change such that the reflected fraction $F_r$ decreases then the power of the reflected portion 9 which is measured at the sensor 11 may decrease even if the power of the laser beam 5 has not changed. In this scenario the feedback system 15 may act to increase the power which is provided to the laser 3 in order to increase the power of the laser beam 5 in response to a decrease in the measured power of the reflected portion 9. The power of the laser beam 5 and the power of the transmitted portion 13 may therefore be increased and thus the laser 3 may be incorrectly calibrated and the stability of the power of the transmitted portion 13 may be adversely affected.

It may therefore be desirable to provide a partial reflector 7 which reflects a substantially constant fraction $f_r$ of a laser beam 5. This may allow the power of the reflected portion 9 of the laser beam 5 to be measured in order to control the power of the laser beam 5 via a feedback system 15. This may also allow the power of the laser beam 5 to be accurately measured since if the fraction $f_r$ of the laser beam 5 which is reflected to form the reflected portion 9 is constant and is known, then a measurement of the power of the reflected portion 9 may be used to deduce the power of the laser beam 5 and/or the power of the transmitted portion 13.

Figure 2:
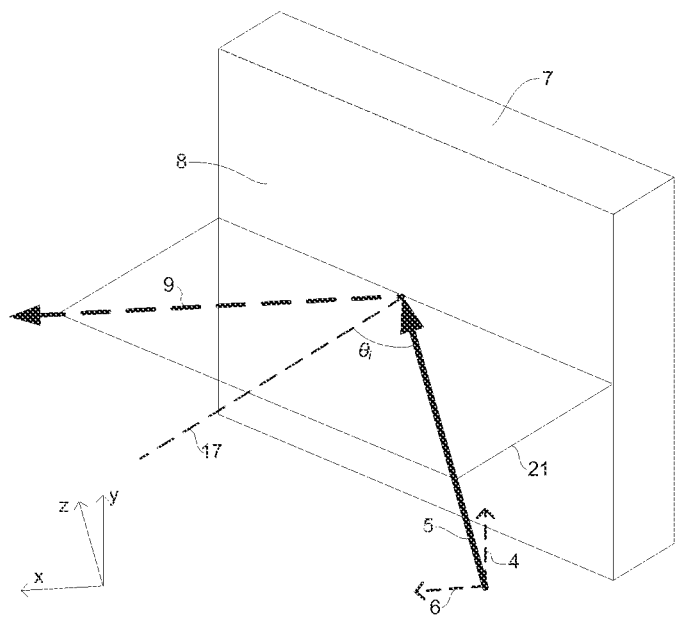
FIG. 2 is a schematic illustration of a perspective view of a partial reflector which forms part of the laser system of FIG. 1.
Figure 3:
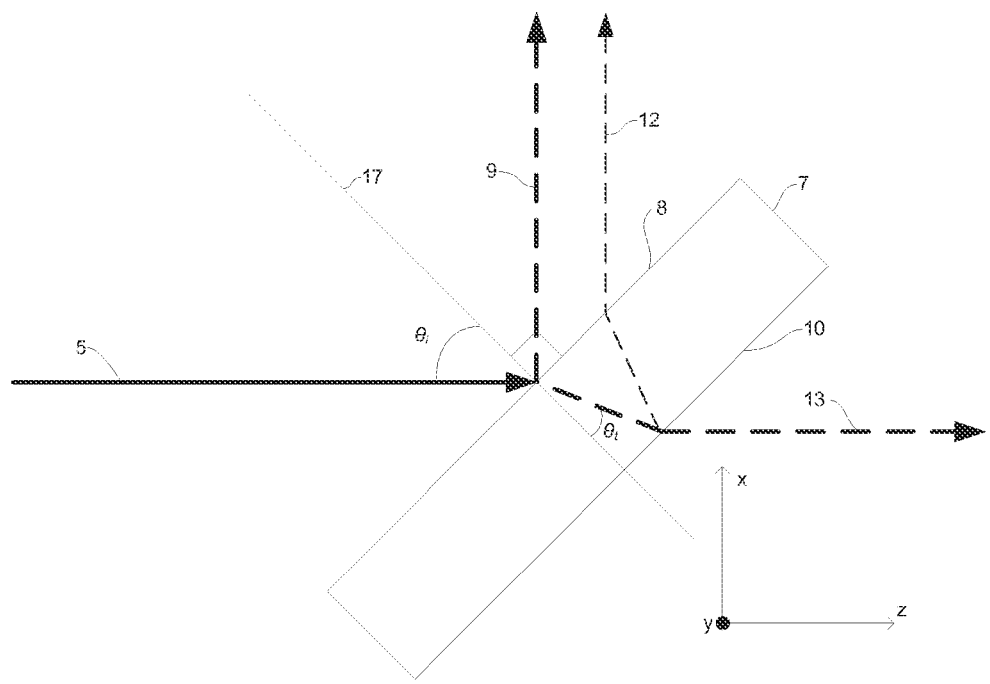
FIG. 3 is a schematic illustration of a plan-view of the partial reflector of FIG. 2.

FIG. 2 is a schematic illustration of a perspective view of the partial reflector 7. FIG. 3 is a schematic illustration of a plan view of the partial reflector 7 in an x-z plane as indicated by the Cartesian coordinates shown in FIG. 3. A y-direction extends out of the page of FIG. 3. The partial reflector 7 may, for example comprise a block of glass such as a block of fused silica or BK7. The partial reflector 7 may, for example, comprise alternative materials such as YAG. A partial reflector 7 may be referred to as a pick-off plate. The laser beam 5 is incident on a partially reflective surface 8 of the partial reflector 7 at an angle of incidence $\theta_i$ with respect to a normal line 17 which lies in a plane of incidence 21 of the laser beam 5 and is normal to the partially reflective surface 8. A reflected portion 9 of the laser beam 5 is reflected at the partially reflective surface 8. It will be appreciated from, for example, FIG. 2 that the plane of incidence 21 is the plane in which both the laser beam 5 and the reflected portion 9 lie.

Referring again to FIG. 3, a remaining portion of the laser beam 5 is transmitted at the partially reflective surface 8 and is refracted such that it propagates in the partial reflector 7 at a transmission angle $\theta_t$ with respect to the normal line 17. The refraction of the laser beam 5 at the partially reflective surface 8 is governed by Snell's law which is given by equation 1.

$$\frac{\sin\theta_i}{\sin\theta_t} = \frac{n_2}{n_1} \qquad (1)$$

Where $n_1$ is the refractive index of the medium (e.g. air) through which the laser beam 5 propagates before it reaches the partial reflector 7 and $n_2$ is the refractive index of the partial reflector 7.

The remainder of the laser beam 5 which is transmitted at the partially reflective surface 8 propagates through the partial reflector 7 to a second surface 10 of the partial reflector 7. A transmitted portion 13 of the laser beam is transmitted at the second surface 13 and propagates out of the partial reflector 7. The transmitted portion 13 is refracted at the second surface 10. In an embodiment in which the partially reflective surface 8 is substantially parallel to the second surface 10, the transmitted portion 13 propagates from the second surface 10 in substantially the same direction as the laser beam 5 propagates towards the partially reflective surface 8.

In some embodiments the second surface 10 may be configured such that it is not parallel with the partially reflective surface 8. The second surface 9 may also be a partially reflective surface and as such a second reflected portion 12 of the laser beam 5 may be reflected at the second surface 10, may propagate back through the partial reflector 7 and may be transmitted at the partially reflective surface 8. If the second surface 10 is configured such that it is not parallel with the partially reflective surface 8 then the second reflected portion 12 which is reflected from the second surface 10 and transmitted at the partially reflective surface 8 may propagate in a different direction to the reflected portion 9. This may be desirable because it may prevent interference between the reflected portion 9 and the second reflected portion 12.

Some of the second reflected portion 12 may be internally reflected back into the partial reflector 7 at the partially reflective surface 8 forming an internally reflected sub-beam. Further subsequent internal reflections may occur which may lead to further internally reflected sub-beams. The fraction of the laser beam 5 which is reflected to form each internally reflected sub-beam diminishes as the number of reflections increases. For ease of illustration further internal reflections are not shown in the figures.

In some embodiments the second reflected portion 12 which is reflected from the second surface 10 may form a reflected portion which is directed to a sensor 11 (instead of the reflected portion 9 which is reflected from the partially reflective surface 8). In this description the reflected portion 9 which is reflected from the partially reflective surface 8 is described as being the reflected portion 9 which is directed to a sensor 11. It will however be appreciated that parts of the invention described in relation to the reflected portion 9 which is reflected from the partially reflective surface 8 may equally apply to the second reflected portion 12 which is reflected from the second surface 10.

The laser beam 5 which is incident on the partially reflective surface 8 of the partial reflector 7 may be linearly polarized. The laser beam 5 may be emitted from the laser 3 with a linear polarization state. Additionally or alternatively the laser beam 5 may, for example, be passed through one or more polarizers which are configured to only transmit radiation having a given linear polarization. For example, the laser beam 5 may pass through one or more waveplates and/or one or more thin film polarizers before being incident on the partial reflector 7. Whilst a polarizer may be configured to only transmit radiation having a given linear polarization state it will be appreciated that in practice a polarizer may transmit a small amount of radiation which has a different linear polarization state. The electric field vector of the laser beam 5 defines a plane of polarization of the laser beam 5, where the electric field vector lies in the plane of polarization. As will be described in further detail below, the reflection of the laser beam 5 from the partially reflective surface 8 depends on the relative orientation of the polarization plane of the laser beam 5 and the plane of incidence 21 of the laser beam 5.

The laser beam 5 which is incident on the partially reflective surface 8 may be considered to comprise a combination of an s-polarized component and a p-polarized component. The s-polarized component is a component of the laser beam 5 whose polarization plane is perpendicular to the plane of incidence 21. An s-polarized component of the laser beam 5 is depicted in FIG. 2 with an electric field vector 4 which lies perpendicular to the plane of incidence 21. The p-polarized component is a component of the laser beam 5 whose polarization plane is parallel with the plane of incidence 21. A p-polarized component of the laser beam 5 is depicted in FIG. 2 with an electric field vector 6 which lies parallel with the plane of incidence 21. The fraction of the laser beam 5 which makes up the s-polarized component and the fraction of the laser beam 5 which makes up the p-polarized component may be controlled by orienting the polarization plane of the laser beam 5 relative to the plane of incidence 21 of the laser beam 5 on the partially reflective surface 8. For example, the laser beam 5 and the partially reflective surface 8 may be oriented relative to each other such that the polarization plane is perpendicular to the plane of incidence 21 and thus the laser beam 5 consists entirely of an s-polarized component. Alternatively the laser beam 5 and the partially reflective surface 8 may be oriented such that the polarization plane is parallel to the plane of incidence and thus the laser beam 5 consists entirely of a p-polarized component.

Alternatively the laser beam 5 and the partially reflective surface 8 may be oriented such that the polarization plane forms an angle of between 0° and 90° with the plane of incidence 21 and thus the laser beam 5 will have both an s-polarized component and a p-polarized component. As will be described below with reference to FIG. 4 the fraction of the laser beam 5 which is s-polarized and the fraction of the laser beam 5 which is p-polarized may, for example, be adjusted by rotating the polarization plane of the laser beam 5 relative to the plane of incidence 21.

Figure 4:
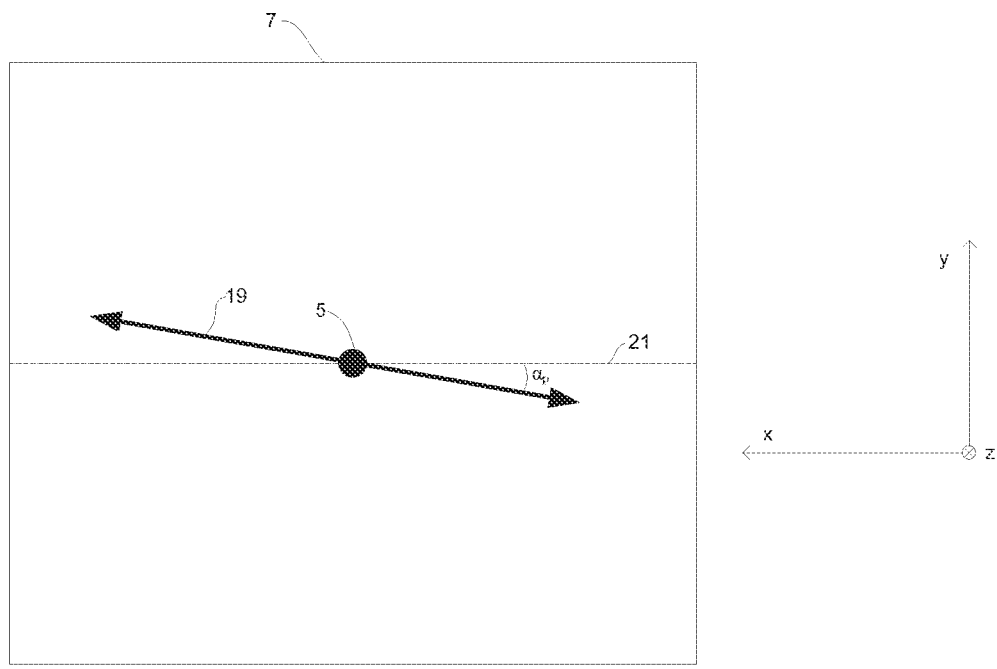
FIG. 4 is a schematic illustration of a front-view of the partial reflector of FIGS. 2 and 3.

FIG. 4 is a schematic illustration of the partial reflector 7 as viewed in the x-y plane. The z-direction, in which the laser beam 5 propagates towards the partial reflector 7, extends into the page of FIG. 4. The plane of polarization 19 of the laser beam is depicted in FIG. 4 with a double-headed arrow. The plane of polarization 19 forms an angle $\alpha_p$ with the plane of incidence 21. The angle $\alpha_p$ between the plane of polarization and the plane of incidence may be referred to as the polarization angle $\alpha_p$.

The relative orientation of the plane of polarization 19 and the plane of incidence 21 and the polarization angle $\alpha_p$ between them may be changed by rotating the plane of polarization 19 with respect to the plane of incidence 21. For example, with reference to FIG. 4, the plane of polarization 19 may be rotated with respect to the plane of incidence in order to vary the polarization angle $\alpha_p$.

Alternatively the polarization angle $\alpha_p$ between the plane of polarization and the plane of incidence 21 may be changed by tilting the partially reflective surface 8 such that the orientation of the plane of incidence 21 is changed whilst the plane of polarization stays the same. For example, with reference to FIG. 2, the partially reflective surface 8 may be tilted such that the surface 8 forms an angle with the y-axis (and is therefore not parallel with the y-axis). Tilting the partially reflective surface 8 such that it forms an angle with the y-axis serves to change the orientation of the plane of incidence 21. It will be appreciated that if the orientation of the plane of incidence 21 is changed and the plane of polarization remains the same then the polarization angle $\alpha_p$ between the plane of incidence 21 and the plane of polarization changes.

The polarization angle $\alpha_p$ between the plane of polarization 19 and the plane of incidence 21, determines the fraction of the laser beam 5 which is s-polarized and the fraction which is p-polarized. The fraction of the laser beam 5 which is polarized parallel to the plane of incidence 21 and is therefore p-polarized is equal to $\cos^2 \alpha_p$ and the fraction of the laser beam 5 which is polarized perpendicular to the plane of incidence 21 and is therefore s-polarized is equal to $\sin^2 \alpha_p$. The fraction of the laser beam 5 which is s-polarized therefore increases as the polarization angle $\alpha_p$ increases (until the polarization angle $\alpha_p$ reaches 90°) and the fraction of the laser beam 5 which is p-polarized decreases as the polarization angle $\alpha_p$ increases (until the polarization angle $\alpha_p$ reaches 90°).

It should be appreciated that if the laser beam 5 is not purely linearly polarized then this may affect the fraction of the laser beam 5 which is s-polarized and the fraction which is p-polarized at the partially reflective surface 8. For example, if the laser beam 5 is elliptically polarized then the electric field vector of the laser beam is not confined to a single plane of polarization as is shown in FIG. 4 (the electric field vector instead traces out an ellipse). In the case of elliptical polarization, the fraction of the laser beam 5 which is s-polarized and the fraction which is p-polarized depends on the relative alignment of the ellipse which is traced out by the electric field vector and the plane of incidence 21. The orientation of the polarization ellipse of the laser beam 5 relative to the plane of incidence 21 may be adjusted such that the laser beam 5 has a desired fraction which is s-polarized and a desired fraction which is p-polarized at the partially reflective surface 8. Similarly, if the laser beam 5 includes a component which is non-polarized then the orientation of the polarized component relative to the plane of incidence 21 may be adjusted such that the laser beam 5 has a desired fraction which is s-polarized and a desired fraction which is p-polarized at the partially reflective surface 8.

The reflectance R of the partially reflective surface 8 for an s-polarized component and a p-polarized component of a laser beam 5 are given by the Fresnel equations. The Fresnel equation for the reflectance $R_s$ of a surface for the s-polarized component is given below as equation 2.

$$R_s = \left| \frac{n_1 \cos\theta_i - n_2 \cos\theta_t}{n_1 \cos\theta_i + n_2 \cos\theta_t} \right|^2 = \left| \frac{n_1 \cos\theta_i - n_2 \sqrt{1 - \left(\frac{n_1}{n_2}\sin\theta_i\right)^2}}{n_1 \cos\theta_i + n_2 \sqrt{1 - \left(\frac{n_1}{n_2}\sin\theta_i\right)^2}} \right|^2 \quad (2)$$

The second expression for the reflectance $R_S$ which is given in equation 2 is derived by substituting an expression for $\theta_t$ which is derived from equation 1 into the first expression for the reflectance $R_S$ which is given in equation 2.

The Fresnel equation for the reflectance $R_p$ of the partially reflective surface 8 for the p-polarized component is given below as equation 3.

$$R_p = \left| \frac{n_1 \cos\theta_t - n_2 \cos\theta_i}{n_1 \cos\theta_t + n_2 \cos\theta_i} \right|^2 = \left| \frac{n_1 \sqrt{1 - \left(\frac{n_1}{n_2}\sin\theta_i\right)^2} - n_2 \cos\theta_i}{n_1 \sqrt{1 - \left(\frac{n_1}{n_2}\sin\theta_i\right)^2} + n_2 \cos\theta_i} \right|^2 \quad (3)$$

The second expression for the reflectance $R_p$ which is given in equation 3 is derived by substituting an expression for $\theta_t$ which is derived from equation 1 into the first expression for the reflectance $R_p$ which is shown in equation 3.

It can be seen from equations 2 and 3 that both the reflectance $R_s$ for the s-polarized component and the reflectance $R_p$ for the p-polarized component are functions of the refractive index $n_2$ of the partial reflector 7 and the angle of incidence $\theta_i$. The refractive index $n_2$ of the partial reflector 7 may change over time. For example, the refractive index $n_2$ may be a function of temperature and temperature may change over time. If the refractive index $n_2$ changes (e.g. due to a change in temperature) then the reflectances $R_s$, $R_p$, of the partially reflective surface 8 for both the s and p-polarized components of the laser beam 5 will change according to equations 2 and 3. Changes in the reflectances $R_s$, $R_p$, of the partially reflective surface 8 may change the fraction $f_r$ of the laser beam 5 which is reflected by the partially reflective surface 8 to form the reflected portion 9 which is directed to the sensor 11. A change in the refractive index $n_2$ may therefore bring about a change in the power of the reflected portion 9 which is measured by the sensor 11 even if the power of the laser beam 5 has not changed. This may cause the feedback system 15 to change the power which is provided to the laser 3 even if the power of the laser beam 5 has not changed. Such an effect will cause the laser 3 to be incorrectly calibrated by the feedback system 15 and may disadvantageously affect the stability of the power of the laser beam 5 and the stability of the power of the transmitted portion 13. It may therefore be desirable to provide a partial reflector 7 which reflects a laser beam 5 to form a reflected portion 9 such that the power of the reflected portion 9 is substantially invariant to changes in the refractive index $n_2$ of the partial reflector 7.

Figure 5:
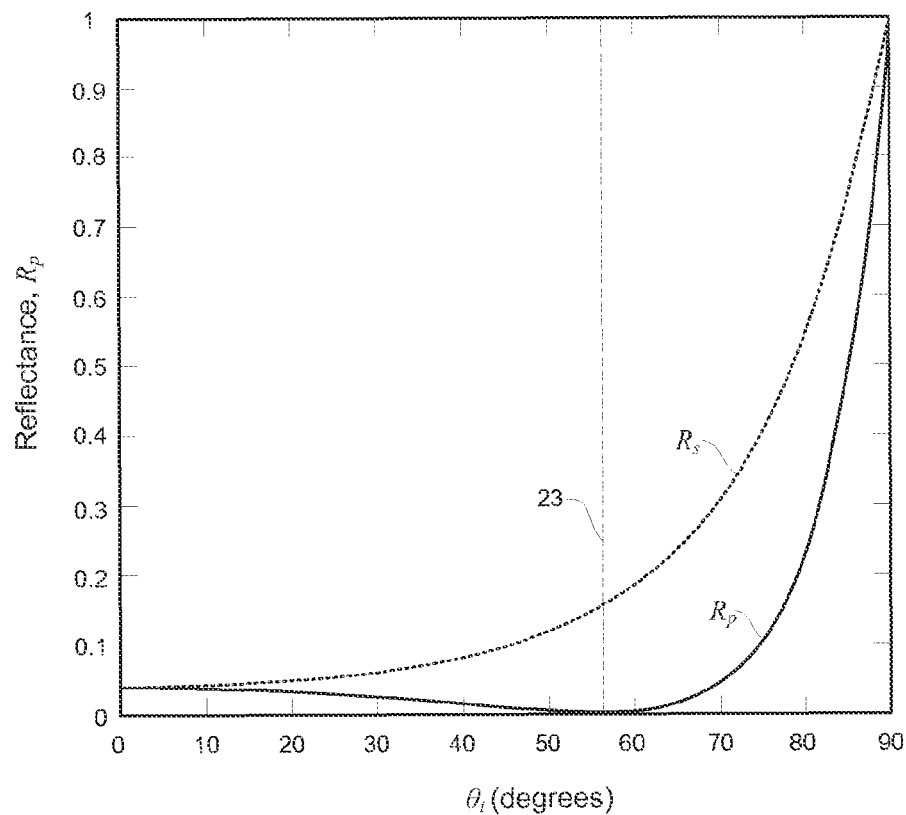
FIG. 5 is a schematic representation of the reflectance of an uncoated partial reflector as a function of an angle of incidence.

FIG. 5 is a schematic representation of the reflectance $R_s$ of the partially reflective surface for the s-polarized component of the laser beam 5 and the reflectance $R_p$ for the p-polarized component of the laser beam 5 as a function of the angle of the incidence $\theta_i$ of the laser beam on the partially reflective surface 8. The values shown in FIG. 5 are calculated for a transition of the laser beam 5 from a medium (e.g. a vacuum or air) having a refractive index $n_1$ of approximately 1 to a medium (e.g. fused silica or BK7) having a refractive index $n_2$ of approximately 1.5. It can be seen from FIG. 5 that at some angles of incidence $\theta_i$ there is a large discrepancy between the reflectance $R_s$ for the s-polarized component and the reflectance $R_p$ for the p-polarized component. The combined reflectance of both the s-polarized and the p-polarized component is therefore a strong function of the fraction of the laser beam 5 which is p-polarized and the fraction of the laser beam 5 which is s-polarized. The fraction $f_r$ of the laser beam 5 which is reflected by the partially reflective surface 8 is therefore a function of the polarization angle $\alpha_p$ as well as the angle of incidence $\theta_i$ and the refractive index $n_2$ of the partial reflector 7.

It can be seen from FIG. 5 that the reflectance $R_p$ for the p-polarized component reduces to a minimum at an angle of incidence which is marked with the line 23 in FIG. 5. The angle of incidence $\theta_i$ at which the reflectance $R_p$ for the p-polarized component is at a minimum is known as Brewster's angle. If the angle of incidence $\theta_i$ is set to Brewster's angle then substantially no p-polarized radiation is reflected.

In some applications it may be desirable to orient the partially reflective surface 8 relative to the laser beam 5 such that the fraction $f_r$ of the laser beam 5 which is reflected to form the reflected portion 9 is relatively small. This may increase the power of the transmitted portion 13 which may be used in an application of the laser beam 5. Keeping the reflected fraction $f_r$ relatively small may reduce the power which is lost from the transmitted portion 13 due to the partial reflector 7. In order to keep the reflected fraction $f_r$ relatively small, the laser beam 5 and the partially reflective surface 8 may be oriented such that substantially all of the laser beam 5 is p-polarized (which may be achieved by setting the polarization angle $\alpha_p$ to zero) and the angle of incidence $\theta_i$ is close to but not at Brewster's angle 23. Such an orientation would result in a small fraction of the p-polarized laser beam being reflected to form the reflected portion 9. However, if such an orientation is used then the reflected fraction $f_r$ may be sensitive to small changes in the angle of incidence $\theta_i$, the polarization angle $\alpha_p$ and the refractive index $n_2$ of the partial reflector 7. As was described above this may be undesirable since changes in factors such as the temperature of the partial reflector 7 may result in changes in the refractive index $n_2$ of the partial reflector 7. A high degree of sensitivity of the reflected fraction $f_r$ to the angle of incidence $\theta_i$, and the polarization angle $\alpha_p$ may also be undesirable since any errors in setting these angles or any changes in these angles will have an impact on the reflected fraction $f_r$.

Figure 6A:
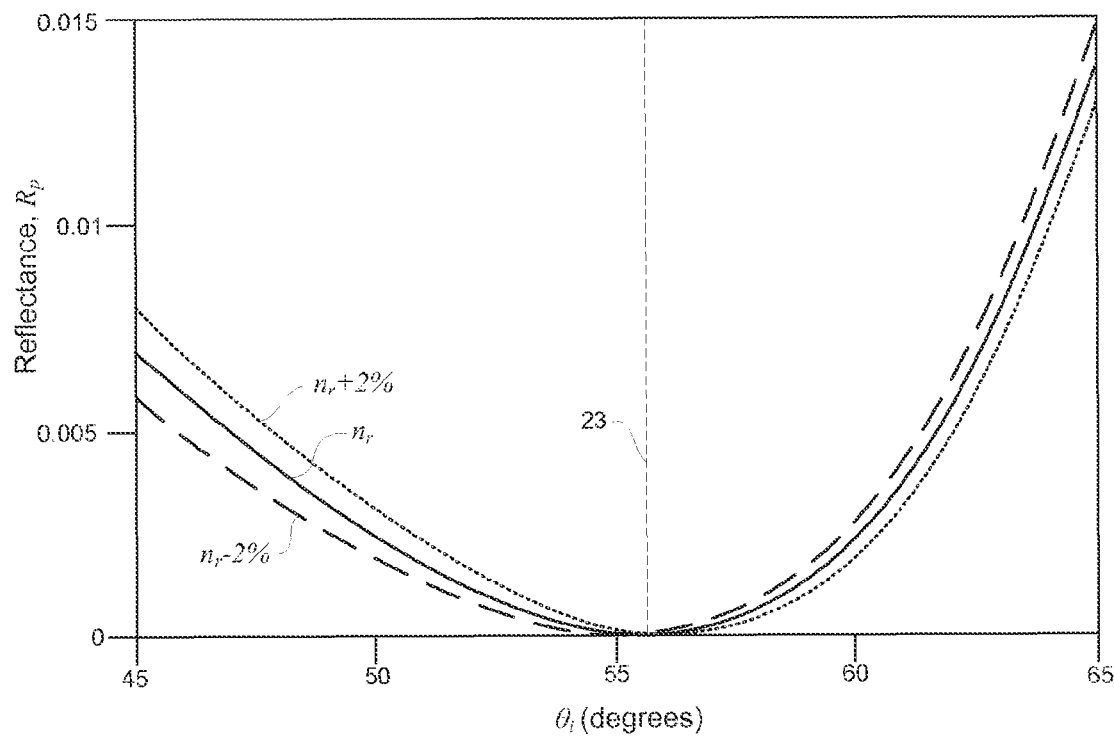
FIG. 6a is a schematic representation of the reflectance of an uncoated partial reflector for p-polarized radiation.

In order to assess the sensitivity of the reflectance of a partially reflective surface 8 to changes in the refractive index $n_2$ of a partial reflector 7, the reflectance of a partially reflective surface 8 may be calculated at different values of the refractive index $n_2$. FIG. 6a is a schematic representation of the reflectance $R_p$ for p-polarized radiation as a function of the angle of incidence $\theta_i$ in the vicinity of Brewster's angle (labelled with the line 23 in FIG. 6a). The reflectance $R_p$ is shown for three different values of the refractive index $n_2$. The solid line in FIG. 6a represents the reflectance $R_p$ for a reference value $n_r$ of the refractive index $n_2$ of the partial reflector 7. In the example shown in FIG. 6a the reference value $n_r$ of the refractive index is approximately 1.46 (which is the refractive index of fused silica at a wavelength of 532 nm). The dashed line in FIG. 6a represents the reflectance $R_p$ for a value of the refractive index $n_2$ which is equal to the reference value $n_r$ minus 2% of the reference value. The dotted line in FIG. 6a represents the reflectance $R_p$ for a value of the refractive index $n_2$ which is equal to the reference value $n_r$ plus 2% of the reference value. The dashed and dotted lines in FIG. 6a therefore show the change in reflectance $R_p$ which results from a 2% variation in the refractive index from the reference value $n_r$. It will be appreciated that Brewster's angle is a function of refractive index and as such each of the lines which are shown in FIG. 6a and which represent different refractive indices have a slightly different associated Brewster's angle. For ease of illustration only Brewster's angle for the reference value $n_r$ of the refractive index is shown in FIG. 6a with the line 23.

Figure 6B:
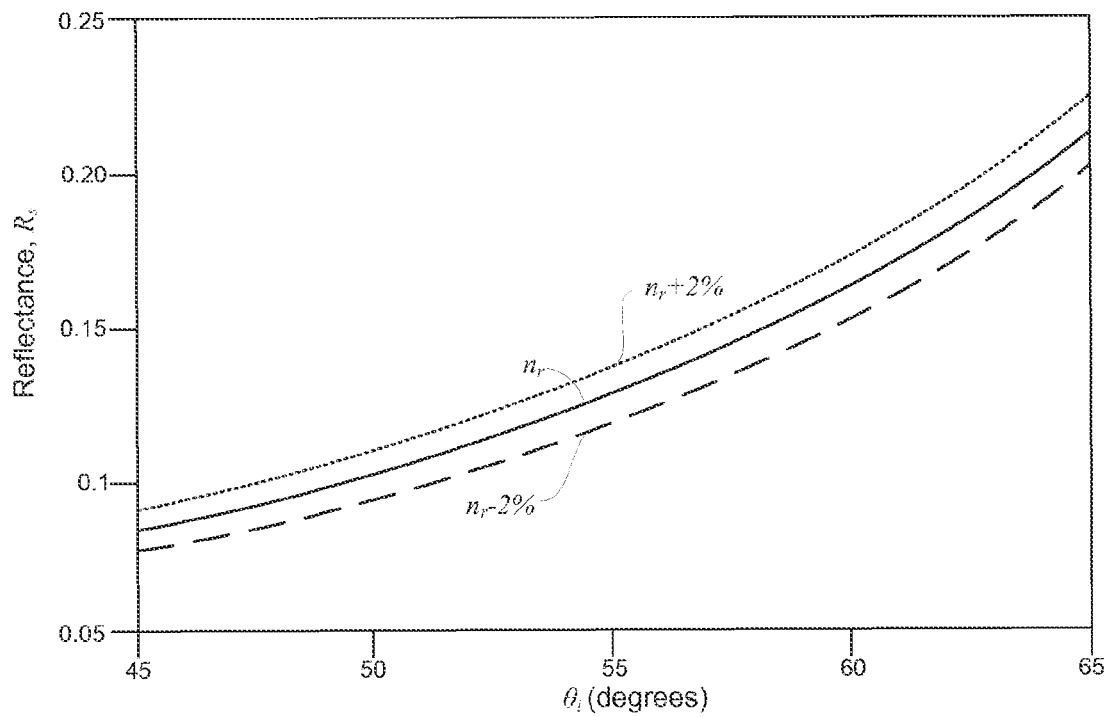
FIG. 6b is a schematic representation of the reflectance of an uncoated partial reflector for s-polarized radiation.

FIG. 6b is a schematic representation of the reflectance $R_s$ for s-polarized radiation in the vicinity of Brewster's angle (labelled with the line 23 in FIG. 6b). FIG. 6b is equivalent to FIG. 6a except that the reflectance $R_s$ for s-polarized radiation is shown. The dashed and dotted lines in FIG. 6b therefore show the change in reflectance $R_s$ for s-polarized radiation which results from a 2% variation in the refractive index $n_2$ from the reference value $n_r$.

It can be seen from FIGS. 6a and 6b that for angles of incidence $\theta_i$ which are significantly less than Brewster's angle a decrease in the refractive index $n_2$ results in a decrease in the reflectance $R_p$ for p-polarized radiation and in a decrease in the reflectance $R_s$ for s-polarized radiation. For angles of incidence $\theta_i$ which are significantly greater than Brewster's angle a decrease in the refractive index $n_2$ also results in a decrease in the reflectance $R_s$ for s-polarized radiation. However, for angles of incidence $\theta_i$ which are greater than Brewster's angle a decrease in the refractive index $n_2$ results in an increase in the reflectance $R_p$ for p-polarized radiation.

Figure 7:
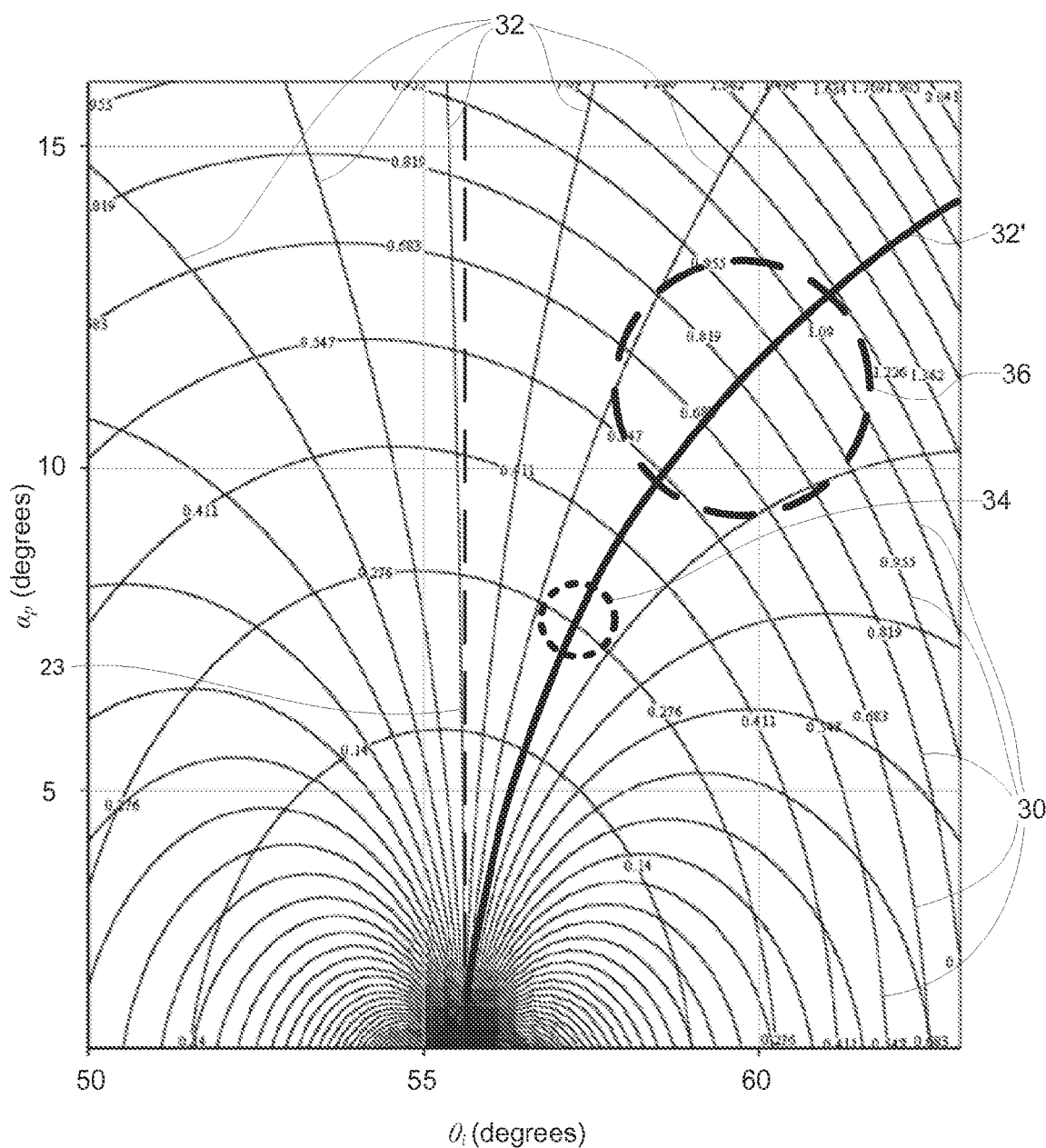
FIG. 7 is a contour plot which shows the fraction of radiation which is reflected from a partial reflector and the sensitivity of the fraction of radiation to changes in the refractive index of the partial reflector.

If a laser beam 5 contains both a p-polarized component and an s-polarized component and the angle of incidence $\theta_i$ is greater than Brewster's angle then a decrease in the refractive index $n_2$ therefore results in a decrease in the amount of s-polarized radiation which is reflected and an increase in the amount of p-polarized radiation which is reflected. In the event that the increase in the amount of p-polarized radiation which is reflected is approximately the same as the decrease in the amount of s-polarized radiation which is reflected then the total amount of radiation which is reflected may remain substantially constant despite the decrease in refractive index $n_2$ of the partial reflector 7. Equivalently an increase in the refractive index $n_2$ will result in an increase in the amount of s-polarized radiation which is reflected and a decrease in the amount of p-polarized radiation which is reflected. If the decrease in the amount of p-polarized radiation which is reflected is approximately the same as the increase in the amount of s-polarized radiation which is reflected then the total amount of radiation which is reflected may remain substantially constant despite the increase in refractive index $n_2$ of the partial reflector 7. This effect may be used in order to arrange the laser beam 5 and the partially reflective surface 8 such that the total fraction $f_r$ of the laser beam 5 which is reflected to form the reflected portion 9 is substantially invariant to the refractive index $n_2$ of the partial reflector 7. FIG. 7 is a contour plot which shows the fraction $f_r$ of a laser beam 5 which is reflected by a partially reflective surface 8 and the sensitivity of the reflected fraction $f_r$ to changes in the refractive index $n_2$ of a partial reflector 7. The horizontal axis of FIG. 7 is the angle of incidence $\theta_i$. The vertical axis of FIG. 7 is the polarization angle $\alpha_p$ and is indicative of the fraction of the laser beam 5 which is p-polarized and the fraction which is s-polarized. As was described above, as the polarization angle $\alpha_p$ increases the fraction of the laser beam 5 which is p-polarized decreases and the fraction which is s-polarized increases.

Two-sets of contours are depicted in FIG. 7. A first set of contours 30 represent the fraction $f_r$ of the laser beam 5 which is reflected from a partially reflective surface 8. The numbers which are attributed to the first set of contours 30 in FIG. 7 are given as a percentage of the laser beam 5 which is reflected by the partially reflective surface 8. Also shown in FIG. 7 is a second set of contours 32 which represent the first derivative of the reflected fraction $f_r$ with respect to the refractive index $n_2$ of a partial reflector 7 normalised by the reflected fraction, $$\frac{df_r}{dn_2}\bigg/f_r$$

A contour 32' which is shown in FIG. 7 with a thick solid line represents values of the angle of incidence $\theta_i$ and the polarization angle $\alpha_p$ at which the reflected fraction $f_r$ is substantially invariant to changes in the refractive index $n_2$. That is the contour 32' represents angles at which $$\frac{df_r}{dn_2} \Big/ f_r$$

is equal to zero. This contour may be referred to as an invariant contour 32'. The remainder of the contours 32 which are shown in FIG. 7 (other than the invariant contour 32') do not have values attributed to them in FIG. 7 but these contours 32 are equally spaced in value about the invariant contour 32'. A partially reflective surface 8 may be advantageously oriented relative to a laser beam 5 and the plane of polarization 19 of the laser beam 5 such that the angle of incidence $\theta_i$ and the polarization angle $\alpha_p$ both lie substantially on the invariant contour 32'. Also shown in FIG. 7 is Brewster's angle which is marked with the dashed line 23.

Whilst reference is made to the reflected fraction $f_r$ being substantially invariant to changes in the refractive index $n_2$, it should be appreciated that the reflected fraction $f_r$ may only be invariant to changes in the refractive index $n_2$ over a limited range of the refractive index $n_2$. For example, for an angle of incidence $\theta_i$ and a polarization angle $\alpha_p$ which both lie substantially on the invariant contour 32' the reflected fraction $f_r$ may be substantially invariant to changes in the refractive index $n_2$ of about 0.1 or less. In some embodiments values of the reflected fraction $f_r$ may be substantially invariant to changes in the refractive index $n_2$ of about 0.05 or less. Changes in the refractive index $n_2$ which are larger than about 0.05 or larger than about 0.1 may cause a change in the reflected fraction $f_r$ even for values of the angle of incidence $\theta_i$ and the polarization angle $\alpha_p$ which lie on the invariant contour 32'. For the purposes of this description any reference to the reflected fraction $f_r$ being substantially invariant to changes in the refractive index $n_2$ should be interpreted to mean that the reflected fraction $f_r$ is substantially invariant to changes in the refractive index $n_2$ over a given range of the refractive index $n_2$. The gradient $$\frac{df_r}{dn_2} \Big/ f_r$$

is equal to zero at positions on the invariant contour 32'.

It will be appreciated from FIG. 7 that there are a number of different combinations of the angle of incidence $\theta_i$ and the polarization angle $\alpha_p$ which lie on the invariant contour 32' and may therefore be chosen. In choosing which angles on the invariant contour 32' to use a number of factors may be considered. A discussion of these factors is given below.

As was mentioned above, it may be advantageous for the reflected fraction $f_r$ to be relatively small. The partially reflective surface 8 may therefore be oriented relative to the laser beam 5 by choosing an angle of incidence $\theta_i$ and a polarization angle $\alpha_p$ which lie substantially on the invariant contour 32' and are positioned towards the bottom of the contour plot shown in FIG. 7 (where the value of the polarization angle $\alpha_p$ is relatively low). For example, values of the angle of incidence $\theta_i$ and the polarization angle $\alpha_p$ may be chosen which lie approximately in a first region 34 which is shown as a dotted circle in FIG. 7. It can be seen from FIG. 7 that angles within the first region 34 give rise to values of the reflected fraction $f_r$ which are close to approximately 0.3%. Values of the reflected fraction $f_r$ which result from angles within the first region 34 are less than values of the reflected fraction $f_r$ which result from angles which lie further up the invariant contour 32'. For example, values of the reflected fraction $f_r$ which result from angles within the first region 34 are less than values of the reflected fraction $f_r$ which result from angles which lie approximately in a second region 36 which is shown as a dashed circle in FIG. 7. It can be seen from FIG. 7 that angles within the second region 36 give rise to values of the reflected fraction $f_r$ which range from approximately 0.5% to approximately 1.2%.

Whilst the partially reflective surface 8 may be oriented relative to the laser beam 5 such that the angle of incidence $\theta_i$ and the polarization angle $\alpha_p$ both lie substantially on the invariant contour 32', the alignment of the angle of incidence $\theta_i$ and the polarization angle $\alpha_p$ may have uncertainties associated with them. It may be desirable to choose angles on the invariant contour 32' at which uncertainties associated with the angle of incidence $\theta_i$ and the polarization angle $\alpha_p$ have a relatively small impact on the normalised sensitivity $$\frac{df_r}{dn_2} \Big/ f_r$$

or the reflected fraction $f_r$ to changes in the refractive index $n_2$.

Whilst angles within the first region 34 give rise to smaller values of the reflected fraction $f_r$ than angles within the second region 36, it can be seen from FIG. 7 that the separation between adjacent contours 32 in the first region 34 is smaller than in the second region 36. The separation between adjacent contours 32 represents a given change in the normalised sensitivity $$\frac{df_r}{dn_2} \Big/ f_r$$

of the reflected fraction $f_4$ to changes in the refractive index $n_2$. A smaller separation between adjacent contours in the first region 34 indicates that a smaller change in the angle of incidence $\theta_i$ and/or the polarization angle $\alpha_p$ is required to bring about the given change (between adjacent contours 32) in the normalised sensitivity $$\frac{df_r}{dn_2} \Big/ f_r.$$

A given change in the angle of incidence $\theta_i$ and/or the polarization angle $\alpha_p$ in the first region 34 will therefore cause a larger change in $$\frac{df_r}{dn_2} \Big/ f_r$$

than the same change in the angle of incidence $\theta_i$ and/or the polarization angle $\alpha_p$ in the second region 36. Put another way the sensitivity $$\left.\frac{df_r}{dn_2}\right/f_r$$

of the reflected fraction $f_r$ to changes in the refractive index $n_2$ is less sensitive to changes in the angle of incidence $\theta_i$ and/or the polarization angle $\alpha_p$ in the second region 36 than in the first region 34. Uncertainties in the angle of incidence $\theta_i$ and the polarization angle $\alpha_p$ will therefore have a smaller impact on $$\left.\frac{df_r}{dn_2}\right/f_r$$

in the first region 34 than in the second region 36. Orienting a partially reflective surface 8 with an angle of incidence $\theta_i$ and a polarization angle $\alpha_p$ which lie in the second region 36 may therefore be advantageous over orienting a partially reflective surface 8 with an angle of incidence $\theta_i$ and a polarization angle $\alpha_p$ which lie in the first region 34. In general the sensitivity of $$\left.\frac{df_r}{dn_2}\right/f_r$$

to uncertainties in the angle of incidence $\theta_i$ and the polarization angle $\alpha_p$ will decrease as the angles move up the invariant contour 32'.

As has been described above the reflected fraction $f_r$ is sensitive to the polarization state of the incoming radiation beam, and variations in the polarization angle $\alpha_p$ will therefore cause variations in the reflected fraction $f_r$. In practice a linearly polarized laser beam 5 which is incident on a partially reflective surface 8 may include a fraction of the laser beam 5 which is in a different polarization state to the rest of the laser beam. For example, a laser beam 5 may pass through one or more birefringent materials before being incident on the partially reflective surface. In particular the laser beam 5 may pass through one or more materials in which birefringence is induced by stress in the materials. Passing through a birefringent material may cause a slight depolarization of a laser beam 5. For example, a laser beam 5 which is linearly polarized in a polarization plane 19 may, after passing through one or more birefringent materials, include a small percentage of the laser beam 5 which is polarized with a perpendicular orientation to the dominant polarization plane 19. For example, approximately 0.1% or approximately 0.2% of the laser beam 5 may be perpendicularly polarized to the dominant polarization plane after passing through one or more birefringent materials.

Figure 8:
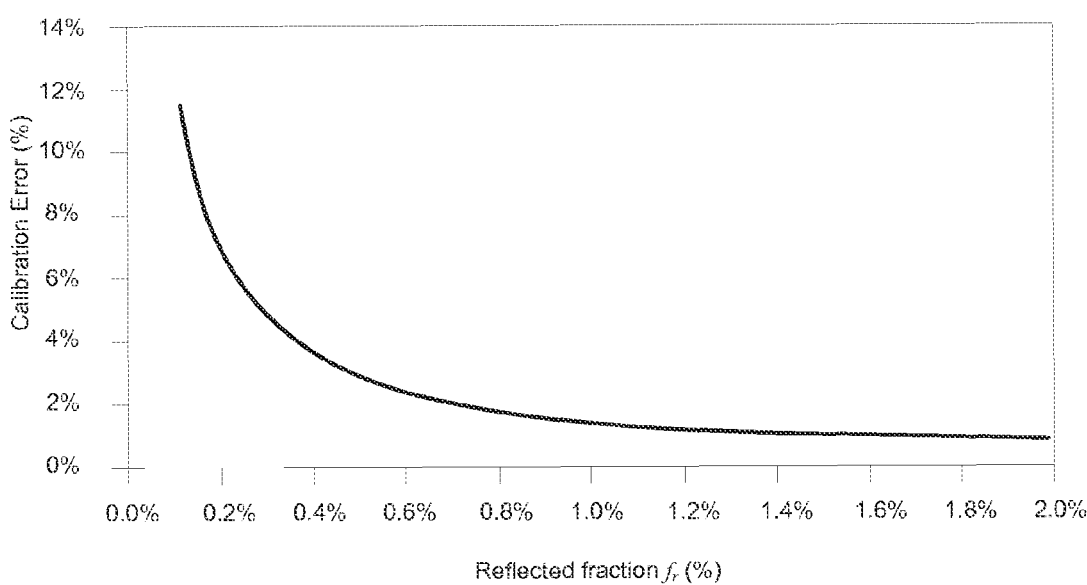
FIG. 8 is schematic representation of a calibration error of a laser system which is caused by depolarization of a laser beam.

A depolarization of the laser beam 5 will change the fraction $f_r$ of the laser beam 5 which is reflected from the partially reflective surface 8. As has been described above, a change in the reflected fraction $f_r$ may cause a feedback system 15 which acts on measurements of the power of a reflected portion 9 of the laser beam 5, to incorrectly calibrate the power of the laser beam 5. FIG. 8 is a schematic representation of a calibration error (represented as a percentage) of a laser beam 5 which is caused when approximately 0.1% of the laser beam 5 is perpendicularly polarized with respect to the desired polarization plane 19 (which may be referred to as a 0.1% depolarization). The calibration error is shown in FIG. 8 as a function of the reflected fraction $f_r$ (which is given as a percentage of the laser beam in FIG. 8) along the invariant contour 32'. Different values of the reflected fraction $f_r$ in FIG. 8 represent different positions along the invariant contour 32' of FIG. 7. Moving from left to right along the line of FIG. 8 therefore corresponds to increasing the angle of incidence $\theta_i$ and the polarization angle $\alpha_p$ so as to move from bottom to top along the invariant contour 32' of FIG. 7.

It can been seen from FIG. 8 that at relatively low values of the reflected fraction $f_r$ (and thus relatively low positions on the invariant contour 32) the calibration error which is caused by a 0.1% depolarization of the laser beam is relatively large. This is because a depolarization of the laser beam 5 causes a distortion of the contours 32 when compared to contours 32 which are calculated for a laser beam 5 which is perfectly linearly polarized with the polarization angle $\alpha_p$. If the angle of incidence $\theta_i$ and the polarization angle $\alpha_p$ are set according to an invariant contour 32' which is calculated for a perfectly linearly polarized laser beam 5 then a depolarization of the laser beam 5 and a resulting distortion of the contours 32 will mean that the angles $\theta_i$, $\alpha_p$ no longer lie on the invariant contour and thus the reflected fraction $f_r$ is no longer invariant to changes in the refractive index $n_2$. As was described above, at relatively low values of the reflected fraction $f_r$ (and relatively low positions on the invariant contour 32') there is a relatively small separation between adjacent contours 32 in FIG. 7 and thus a relatively small distortion of the contours 32 which is caused by a relatively small depolarization of the laser beam 5 may cause a given angle of incidence $\theta_i$ and a given polarization angle $\alpha_p$ to lie on a different contour 32. A depolarization of the laser beam 5 therefore causes a relatively large change in the reflected fraction $f_r$ and a relatively large calibration error at relatively small values of the reflected fraction $f_r$.

As the reflected fraction $f_r$ is increased by increasing the angles $\theta_i$, $\alpha_p$ so as to move up the invariant contour 32', the separation between adjacent contours 32 increases and the sensitivity of the reflected fraction $f_r$ to a depolarization of the laser beam 5 decreases. As can be seen in FIG. 8 this causes a decrease in the calibration error which is caused by a 0.1% depolarization of the laser beam 5. For example, for values of the reflected fraction $f_r$ of greater than approximately 0.5% the calibration error decreases below approximately 3%. For values of the reflected fraction $f_r$ of greater than approximately 0.8% the calibration error decreases below approximately 2%. For values of the reflected fraction $f_r$ of greater than approximately 0.9% the calibration error decreases below approximately 1.5%.

In some embodiments a non-plane polarized portion of the laser beam 5 (which may, for example, be caused by a depolarization of the laser beam 5) which is incident on the partially reflective surface 8 may be reduced, for example, by passing the laser beam 5 through a polarizer before it is incident on the partially reflective surface 8. This may ensure that only radiation which has a desired polarization passes through the polarizer and is incident on the partially reflective surface 8. The polarizer may be positioned relatively close along the optical path of the laser beam 5 to the partially reflective surface 8. This may ensure that the laser beam 5 passes through little or no material (e.g. birefringent material or a material exhibiting stress birefringence) which may depolarise the laser beam between the polarizer and the partially reflective surface 8. For example, a thin film polarizer may be disposed on or near to the partially reflective surface 8 such that only radiation having a desired polarization is incident on the partially reflective surface 8.

In embodiments in which a polarizer is used to mitigate a depolarization of the laser beam 5, the relative importance of reducing the sensitivity of the reflected fraction $f_r$ to changes in the polarization angle (of the laser beam 5 which is incident on the polarizer) may be reduced. For example, in embodiments in which a polarizer is used relatively smaller values of the angles $\theta_i$, $\alpha_p$ may be chosen in order to reduce the reflected fraction $f_r$ when compared to embodiments in which no polarizer is used. In embodiments in which no polarizer is used reducing the sensitivity of the reflected fraction $f_r$ to changes in the polarization state of the laser beam 5 may become more important and as such larger values of the angles $\theta_i$, $\alpha_p$ may be chosen.

In general it may be desirable to orient the partially reflective surface 8 with an angle of incidence $\theta_i$ and a polarization angle $\alpha_p$ which lie substantially on the invariant contour 32' and which result in a reflected fraction $f_r$ which is greater than or equal to approximately 0.5%. This may, for example, correspond to positions substantially on the invariant contour 32' at which the angle of incidence $\theta_i$ is greater than or equal to approximately 3 degrees more than Brewster's angle. This may, for example, correspond to positions substantially on the invariant contour 32' at which the polarization angle $\alpha_p$ is greater than or equal to approximately 8 degrees. In some embodiments it may be desirable to orient the partially reflective surface 8 with an angle of incidence $\theta_i$ and a polarization angle $\alpha_p$ which lie substantially on the invariant contour 32' and which result in a reflected fraction $f_r$ which is greater than or equal to approximately 1%.

A position along the invariant contour 32' may be chosen according to the relative importance of, for example, the size of the reflected fraction $f_r$ and the sensitivity of the reflected fraction or the normalised sensitivity $$\frac{df_r}{dn_2} / f_r$$

to changes in the polarization angle $\alpha_p$ and/or the angle or incidence $\theta_i$. For example, for some embodiments it may be particularly desirable for the reflected fraction $f_r$ to be relatively small. In such an embodiment values of the angle of incidence $\theta_i$ and the polarization angle $\alpha_p$ which lie substantially on the invariant contour 32' may be chosen such that the reflected fraction is approximately 0.5%.

In other embodiments it may be particularly desirable to reduce the sensitivity of the normalised sensitivity $$\frac{df_r}{dn_2} / f_r$$

to changes in the polarization state of the laser beam 5 (which may, for example, be caused by a depolarization of the laser beam 5) such that a relatively low calibration error is caused by a change in the polarization state. In such embodiments, a relative increase in the reflected fraction $f_r$ in order to decrease the calibration error may be acceptable and values of the angle of incidence $\theta_i$ and the polarization angle $\alpha_p$ may be chosen which result in a larger reflected fraction $f_r$. For example, an angle of incidence $\theta_i$ which is greater than approximately 4 degrees more than Brewster's angle may be used. In some embodiments an angle of incidence $\theta_i$ which is greater than approximately 5 degrees more than Brewster's angle or greater than approximately 6 degrees more than Brewster's angle may be used. This may correspond to values of the polarization angle $\alpha_p$ which are greater than approximately 10 degrees, greater than approximately 11 degrees, greater than approximately 12 degrees or greater than approximately 13 degrees. The reflected fraction $f_r$ may, for example, be greater than approximately 0.5%, greater than approximately 0.75%, greater than approximately 1.0% or may be greater than approximately 1.5%.

FIGS. 6-8 were calculated for a partial reflector 7 comprising a material having a refractive index of approximately 1.46 (which is the refractive index of fused silica at a wavelength of 532 nm). However it should be appreciated that equivalent calculations may be performed for partial reflectors 7 comprising other materials having different refractive indices. In particular an invariant contour 32' may be derived for a partial reflector comprising other materials and suitable values of the angle of incidence $\theta_i$ and the polarization angle $\alpha_p$ may be chosen which lie substantially on the invariant contour 32'. Other suitable materials may, for example, include YAG, BK7, or other optical glasses known to those skilled in the art. Each different material may have a different refractive index for which a different corresponding contour plot and invariant contour 32' may be calculated. A suitable material from which to manufacture the partial reflector 7 may be chosen according to one or more factors which may include the refractive index $n_2$ of the material, the optical transmission of the material, the susceptibility of the material to damage and the susceptibility of the material to stress birefringence.

In an embodiment the partial reflector comprises fused silica or BK7, the angle of incidence $\theta_i$ is greater than about 54° and less than about 56° and the polarization angle $\alpha_p$ is greater than about 8° and less than about 12°. In an alternative embodiment the partial reflector comprises fused silica or BK7, the angle of incidence $\theta_i$ is greater than about 56° and less than about 59° and the polarization angle $\alpha_p$ is greater than about 10° and less than about 15°. In an another alternative embodiment the partial reflector comprises YAG, the angle of incidence $\theta_i$ is greater than about 62° and less than about 64° and the polarization angle $\alpha_p$ is greater than about 7° and less than about 11°.

The orientation of a partially reflective surface 8 of a partial reflector 7 relative to a laser beam 5 has been discussed above in the context of reducing a variation of a fraction $f_r$ of the laser beam 5 which is reflected from the partially reflective surface with changes in the refractive index $n_2$ of the partial reflector 7. However in practice there may be other factors which affect the reflected fraction $f_r$ and which may be accounted for in the orientation of the partially reflective surface 8. For example, during use contamination may be deposited onto the partially reflective surface 8 which may change the reflected fraction $f_r$. The laser beam 5 may act to optically trap contamination which may be present in the vicinity of the laser beam 5. This may cause contamination to be deposited on the partially reflective surface 8 in a region of the partially reflective surface 8 on which the laser beam 5 is incident.

Figure 9:
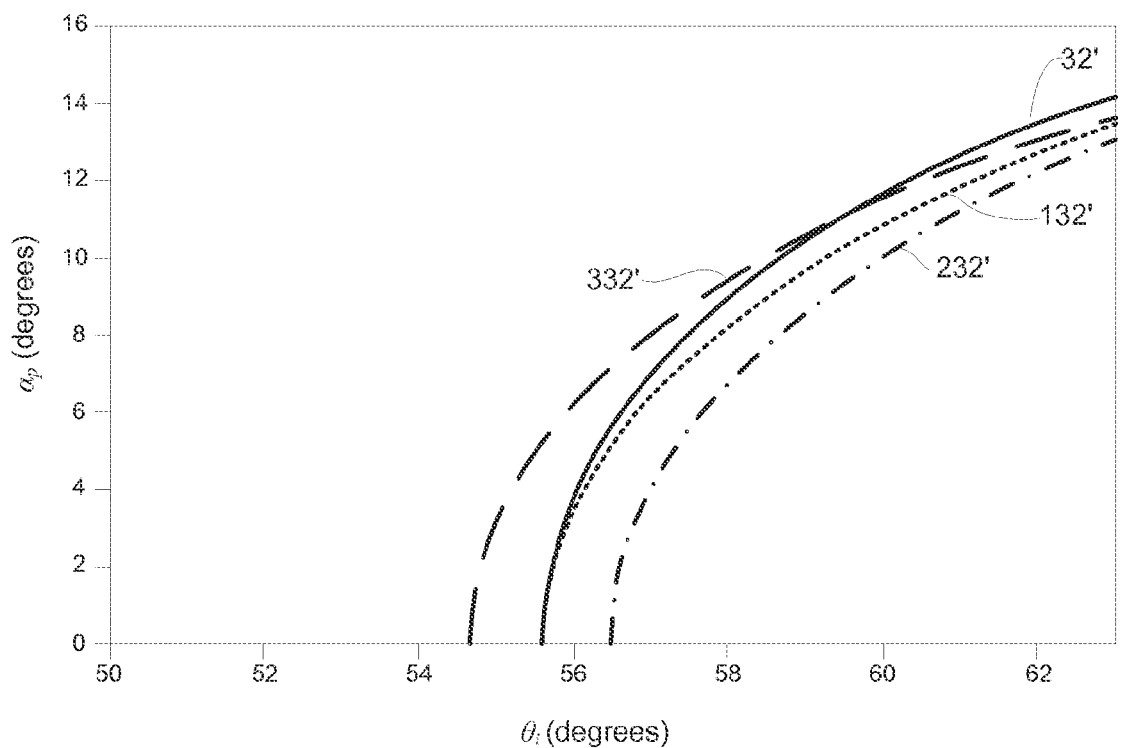
FIG. 9 is a schematic representation of contours which depict angles at which a fraction of a laser beam which is reflected from a partial reflector is invariant to changes in the refractive index of the partial reflector or to changes in a thickness of a contamination layer on the partial reflector.

Invariant contours which are analogous to the invariant contour 32' which is shown in FIG. 7 may be calculated for a contamination layer of varying thickness. FIG. 9 is a schematic representation of invariant contours for different contamination scenarios. The invariant contour 32' which is shown with a solid line in FIG. 9 is the same as the invariant contour 32' which is shown in FIG. 7 and represents values of the angle of incidence $\theta_i$ and the polarization angle $\alpha_p$ at which the reflected fraction $f_r$ is invariant with changes in the refractive index $n_2$ of the partial reflector 7. Also shown in FIG. 9 are three contamination invariant contours 132', 232' and 322' which represent angles at which the reflected fraction $f_r$ is invariant to changes in the thickness of a contamination layer which is disposed on the partially reflective surface 8.

A first contamination invariant contour 132' which is shown in FIG. 9 with a dotted line is calculated for a case in which there is a thin layer of contamination deposited on the partially reflective surface 8, where the contamination layer has a refractive index which is substantially the same as the refractive index of the partial reflector 7. A second contamination invariant contour 232' which is shown in FIG. 9 with a dash-dot line is calculated for a case in which there is a thin layer or contamination deposited on the partially reflective surface, where the contamination layer has a refractive index which is 0.05 greater than the refractive index of the partial reflector 7. A third contamination invariant contour 332' which is shown in FIG. 9 with a dashed line is calculated for a case in which there is a thin layer of contamination deposited on the partially reflective surface, where the contamination layer has a refractive index which is 0.05 less than the refractive index of the partial reflector 7. For each of the contamination layers used to calculate the contamination invariant contours 132', 232', 332', the contamination layer is assumed to have a thickness which is much less than the wavelength of the laser beam 5.

It can be seen from FIG. 9 that the contamination invariant contours 132', 232' and 332' follow a similar path to the invariant contour 32'. Angles of incidence $\theta_i$ and polarization angles $\alpha_p$ which lie substantially on the invariant contour 32' may therefore, to a reasonable approximation, also represent angles at which the reflected fraction $f_r$ is substantially invariant to changes in the thickness of a contamination layer. In particular it can be seen from FIG. 9 that (over the range of angles shown in FIG. 9) the contamination invariant contours 132', 232' and 332' start to converge with each other and with the invariant contour 32' as the angle of incidence $\theta_i$ and polarization angle $\alpha_p$ increase. It may be therefore be desirable to orient the partially reflective surface with angles $\theta_i$, $\alpha_p$ at which the invariant contour 32' is close to one or more of the contamination invariant contours 132', 232', 332' such that the reflected fraction $f_r$ is relatively invariant to both changes in the refractive index $n_2$ and the thickness of a contamination layer.

For some embodiments the approximate refractive index of a contaminant to which the partially reflective surface 8 is likely to be exposed may be known. For example, the refractive index of a contamination layer may be measured and/or may be predicted based on knowledge of one or more materials which are likely to form a contamination layer. The refractive index of a contamination layer may, for example, be determined using a technique known as ellipsometry. In such embodiments an invariant contour may be calculated which represents angles $\theta_i$, $\alpha_p$ at which the reflected fraction $f_r$ is invariant with changes in the refractive index $n_2$ of the partial reflector 7 and/or with changes in the thickness of a contamination layer of known refractive index. An angle of incidence $\theta_i$ and a polarization angle $\alpha_p$ may then be chosen which lie substantially on the calculated contour.

In some embodiments the invariance of the reflected fraction $f_r$ to changes in the thickness of a contamination layer may be of relatively higher importance than, for example, the invariance of the reflected fraction $f_r$ to changes in the refractive index $n_2$ of the partial reflector 7. In such embodiments an angle of incidence $\theta_i$ and a polarization angle $\alpha_p$ may be chosen which are optimised for the invariance of the reflected fraction $f_r$ to changes in the thickness of a contamination layer on the partially reflective surface 8.

Whilst reference is made to the reflected fraction $f_r$ being substantially invariant to changes in the thickness of a contamination layer, it should be appreciated that the reflected fraction $f_r$ may only be invariant to changes in the thickness of a contamination layer over a limited range of the thickness of the contamination layer. That is, the gradient of the reflected fraction $f_r$ with respect to the thickness of the contamination layer may only be substantially equal to zero over a limited range of the thickness of the contamination layer. For example, for an angle of incidence $\theta_i$ and a polarization angle $\alpha_p$ which both lie substantially on a contamination invariant contour (e.g. contamination invariant contour 132', 232' or 332') the reflected fraction $f_r$ may be substantially invariant to changes in the thickness of the contamination layer within a range in which the thickness of the contamination layer is much less than the wavelength of the laser beam 5. In an embodiment the wavelength of the laser beam 5 may, for example, be approximately 532 nm. In such an embodiment the reflected fraction $f_r$ may, for example, be substantially invariant to changes in the thickness of the contamination layer whilst the thickness of the contamination layer is much less than 532 nm. In another embodiment the wavelength of the laser beam 5 may be approximately 1064 nm and the reflected fraction $f_r$ may be substantially invariant to changes in the thickness of the contamination layer whilst the thickness of the contamination layer is much less than 1064 nm. For the purposes of this description any reference to the reflected fraction $f_r$ being substantially invariant to changes in the thickness of a contamination layer should be interpreted to mean that the reflected fraction $f_r$ is substantially invariant to changes in the thickness of the contamination layer whilst the thickness of the contamination layer is much less than the wavelength of the laser beam 5.

In some embodiments the wavelength of the laser beam 5 may, for example, be in the ultraviolet range. In an embodiment in which the laser beam 5 has a wavelength which is in the ultraviolet range photons in the laser beam 5 may have enough energy to induce chemical reactions which may lead to an increase in contamination on a partially reflective surface 8. The shorter the wavelength of the laser beam 5, the greater the energy of photons of the laser beam 5 and thus the greater the ability of the laser beam 5 to induce chemical reactions. An invariance of the reflected fraction $f_r$ to changes in the thickness of a contamination layer on the partially reflective surface 8 may therefore be particularly important for an embodiment in which the laser beam 5 has a wavelength which is in the ultraviolet range. For example an invariance of the reflected fraction $f_r$ to changes in the thickness of a contamination layer on the partially reflective surface 8 may be particularly important in an embodiment in which the laser beam 5 has a wavelength of approximately 355 nm or approximately 266 nm.

It can be seen from FIG. 9 that the first contamination invariant contour 132', which is calculated for a case in which a contamination layer has substantially the same refractive index as the partial reflector 7, follows the invariant contour 32', which is calculated for a case in which there is no contamination layer (and the reflected fraction $f_r$ is substantially invariant to changes in the refractive index $n_2$), relatively closely (when compared to, for example, the second 232' and third 332' contamination invariant contours). A contamination layer which has a similar refractive index to the partial reflector 7 may therefore cause smaller changes in the reflected fraction $f_r$ than a contamination layer which has different refractive index to the partial reflector 7. In an embodiment in which the expected refractive index of a contamination layer is known, a partial reflector 7 may be formed from a material which has a refractive index which is close to or the same as the refractive index of the expected contamination layer in order to reduce the effect of a contamination layer on the reflected fraction $f_r$.

Figure 10:
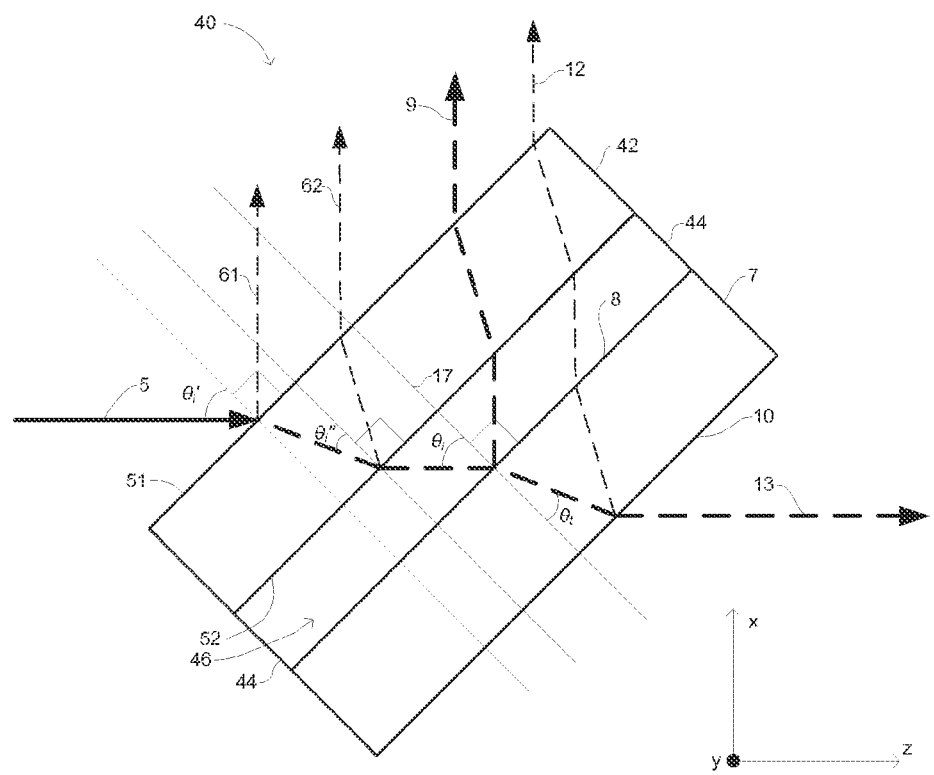
FIG. 10 is a schematic illustration of an optical assembly according to an embodiment of the invention.

In order to further reduce the effect of a contamination layer on the reflected fraction $f_r$ it may be desirable to reduce an amount of contaminant which may be deposited on the partially reflective surface 8 and thereby reduce the thickness of a contamination layer which may form on the partially reflective surface 8. The partially reflective surface 8 may, for example, be sealed from an external environment in order to reduce an amount of contaminant which may come into contact with the partially reflective surface 8. FIG. 10 is a schematic depiction of an embodiment of an optical assembly 40 which includes a partial reflector 7 comprising a partially reflective surface 8 which is sealed from the external environment. The partially reflective surface 8 is sealed from the external environment by an optical element 42 and walls 44 which together form a sealed chamber 46. The chamber 46 is sealed from the external environment in order to prevent contamination from entering the chamber and being deposited on the partially reflective surface 8. The optical element 42 may have the same refractive index as the partial reflector 7 or may have a different refractive index to the partial reflector 7.

The term "external environment" is used herein to refer to an environment which is external to an optical assembly which includes a partial reflector 7 (e.g. the optical assembly 49 which is shown in FIG. 10). In some embodiments an optical assembly may be positioned within a laser housing (not shown). In such an embodiment the external environment may be considered to include the environment inside the laser housing since this is external to the optical assembly.

In an alternative embodiment the optical element 42 may contact the partially reflective surface 8 so as to seal the partially reflective surface 8 from the external environment. In such an embodiment there is no chamber between the optical element 42 and the partially reflective surface 8 since the optical element 42 and the partially reflective surface are in contact with each other. This may prevent any contamination layer from building up on the partially reflective surface 8. The optical element 42 may, for example, be optically bonded to the partially reflective surface 8 so as to seal the partially reflective surface 8 from the external environment. For example, an optical adhesive may be used to bond the partially reflective surface 8 and the optical element 42 together. In some embodiments the partially reflective surface 8 and the optical element 42 may be sealed together by exposing them to a high temperature and pressure so as to form an adhesive free bond between them.

In an embodiment in which the optical element 42 and the partially reflective surface 8 are in contact with each other the partial reflector 7 and the optical element 42 may have different refractive indices. The difference in refractive index between the optical element 42 and the partial reflector 8 causes a partial reflection of the laser beam from the interface between the optical element 42 and the partial reflector 7 at the partially reflective surface 8. In such an embodiment the change in refractive index at the partially reflective surface 8 may be smaller than the change in refractive index in an embodiment in which the partially reflective surface is exposed to a gas. This may mean that Brewster's angle at the partially reflective surface 8 is smaller in embodiments in which the optical element 42 is in contact with the partially reflective surface 8.

The sealed chamber 46 may contain some contamination which is present in the chamber 46 when it is sealed during manufacturing. However by sealing the chamber 46 the maximum thickness of a contamination layer which may become deposited on the partially reflective surface is limited by the amount of contamination which is present in the chamber 46 when it is sealed. The chamber 46 may be sealed in a clean environment so as to reduce the amount of contamination which is sealed in the chamber 46. The amount of contamination which is sealed in the chamber 46 may be reduced by reducing the volume of the chamber 46. The chamber may be sealed in an environment in which a given amount of contamination per unit volume of air is present. Reducing the volume of air which is sealed within the chamber 46 may therefore reduce the amount of contamination which is sealed in the chamber. Due to the effect of optical trapping a large proportion of the contamination which is present in the chamber 46 may be trapped by the laser beam 5 and may be deposited on a region of partially reflective surface on which the laser beam 5 is incident. Reducing the total amount of contamination which is present in the chamber 46 may reduce the thickness of a contamination layer which forms on the partially reflective surface 8. The volume of the sealed chamber 46 may, for example, be less than approximately 1 cubic centimeter. In some embodiments the volume of the sealed chamber 46 may be less than approximately 0.2 cubic centimeters. It will be appreciated that in embodiments in which the optical element and the partially reflective surface 8 are in contact, there is substantially no volume between them.

Some contamination which is introduced into a sealed chamber 46 may originate from the internal surfaces of the sealed chamber 46. For example, when a chamber 46 is sealed some contamination may be present on the partially reflective surface 8 of the partial reflector 7, on the optical element 42 and/or on the walls 44 which form the sealed chamber 46. It may be desirable to reduce the total surface area of the internal surfaces of the sealed chamber 46 so as reduce the amount of contamination which is introduced into the sealed chamber via the internal surfaces. The total surface area of the internal surfaces of the sealed chamber 46 may, for example, be less than about 5 $cm^2$, less than about 2 $cm^2$, less than about 1 $cm^2$ or less than about 0.5 $cm^2$.

As can be seen in FIG. 10, the laser beam passes through the optical element 42 before being incident on the partially reflective surface 8. The optical element 42 may be similar to the partial reflector 7 and may, for example, comprise a block of glass. The optical element 42 may, for example, comprise fused silica or BK7. The optical element 42 may, for example, be referred to as an optical plate. The optical element comprises a first surface 51 on which the laser beam 5 is incident and a second surface 52 through which the laser beam leaves the optical element 42. The first and second surfaces 51, 52 of the optical element 42 may behave as partially reflective surfaces in a similar way to the partially reflective surface 8. A first reflected sub-portion 61 may be reflected at the first surface 51 and a second reflected sub-portion 62 may be reflected from the second surface 52.

The reflection and transmission at the first surface 51 of the optical element 42 depends on the refractive index of the optical element 42, the refractive index of the medium through which the laser beam 5 passes before being incident on the first surface 51 and the orientation of the first surface 51 with respect to the laser beam 5 and the plane of polarization 19 of the laser beam 5. The reflection and transmission at the second surface 52 of the optical element 42 depends on the refractive index of the optical element 42, the refractive index of the medium in the sealed chamber 44 and the orientation of the second surface 52 with respect to the laser beam 5 and the plane of polarization 19 of the laser beam 5. The reflection and transmission at the first and second surfaces may be calculated using equations 2 and 3.

In an embodiment in which the reflected portion 9 which is reflected at the partially reflective surface 9 is directed to a sensor 11 it is desirable that the reflected portion 9 represents a substantially constant fraction of the laser beam 5. It will be appreciated that in the embodiment which is depicted in FIG. 10, the fraction of the laser beam 5 which forms the reflected portion 9 depends not only on the fraction $f_r$ of the laser beam 5 which is reflected at the partially reflective surface 8 but also on the fraction of the laser beam 5 which is transmitted at the first 51 and second 52 surfaces of the optical element 42 before the laser beam 5 is incident on the partially reflective surface 8 and the fraction of the reflected portion which is transmitted at the first 51 and second 52 surfaces of the optical element 42. It is therefore desirable that the fraction of the laser beam 5 which forms the reflected portion 9 which is directed to a sensor 11 is substantially invariant both to changes in the refractive index of the partial reflector 7 and to changes in the refractive index of the optical element 42.

The first surface 51 of the optical element 42 may, for example, be oriented such that it is perpendicular to the plane of polarization 19 of the laser beam 5 such that the plane of polarization 19 lies in the plane of incidence at the first surface 51 and the entire laser beam 5 is p-polarized with respect to the first surface 51. The first surface 51 of the optical element 42 may also be oriented such that an angle of incidence $\theta_i'$ with which the laser beam 5 is incident on the first surface 51 is approximately equal to Brewster's angle for the first surface 51 such that substantially all of the laser beam 5 is transmitted at the first surface 51. The laser beam 5 is refracted at the first surface 51 such that it is incident on the second surface 52 of the optical element 42 at an angle of incidence $\theta_i''$. The second surface 52 may be oriented such that it is perpendicular to the plane of polarization 19 of the laser beam 5 such that the entire laser beam 5 which is incident on the second surface 52 is p-polarized with respect to the second surface 52. The second surface 2 of the optical element 42 may also be oriented such that the angle of incidence $\theta_i''$ with which the laser beam 5 is incident on the second surface 52 is approximately equal to Brewster's angle for the second surface 52 such that substantially all of the laser beam 5 is transmitted at the second surface 52. It will be appreciated that Brewster's angle for the second surface 52 may be different to Brewster's angle at the first surface 51 due to the different transitions between refractive indices at the first and second surfaces 51, 52. In some embodiments, the chamber 46 may contain a gas or a mixture of gases which have a different refractive index than gases which form the environment outside of the chamber 46. Brewster's angle may therefore be different at surfaces inside the chamber 46 than outside of the chamber 46.

Orienting the first 51 and the second 52 surfaces of the optical element 42 at Brewster's angle for the respective surfaces and orienting the first and second surfaces such that they are perpendicular to the plane of polarization 19 of the laser beam 5 (and thus the plane of polarization lies in the plane of incidence) reduces any reflection of the laser beam 5 prior to being incident on the partially reflective surface 8. The partially reflective surface 8 may be oriented such that it is not perpendicular with the plane of polarization 19 of the laser beam 5 and thus comprises both a p-polarized component and an s-polarized component at the partially reflective surface 8. The partially reflective surface 8 may be oriented such that the laser beam 5 is incident on it at an angle of incidence $\theta_i$ which lies in a plane of incidence 21, where the plane of incidence 21 forms a polarization angle $\alpha_p$ with the plane of polarization 19 of the laser beam 5.

An invariant contour 32 may be calculated for combinations of the angle of incidence $\theta_i$ and the polarization angle $\alpha_p$ which cause the fraction of the laser beam 5 which forms the reflected portion 9 to be substantially invariant with changes in the refractive index $n_2$ of the partial reflector 7 and/or the refractive index of the optical element 42. In the embodiment of FIG. 10 the fraction of the laser beam 5 which forms the reflected portion 9 also depends on the transmission of the fraction which is reflected from the partially reflective surface back through the optical element 42. The fraction of the laser beam 5 which is reflected at the partially reflective surface 8 may be incident on the first surface 51 and/or on the second surface 52 of the optical element 42 at angles which are not equal to Brewster's angles for the first and second surfaces respectively. Some of the reflected fraction may therefore be reflected at the first and/or the second surfaces and as such some radiation may be lost from the reflected portion 9. The reflection and transmission at the first and second surfaces may be accounted for when calculating an invariant contour such that the invariant contour represents angles at which the reflected portion 9 which is transmitted through the optical element 42 is substantially invariant with changes in the refractive index $n_2$ of the partial reflector, changes in the refractive index of the optical element 42 and/or changes in a thickness of a contamination layer which is disposed on any of the surfaces of the optical element 42 or the partial reflector 7.

The optical element 42 and the partial reflector 7 may be oriented relative to each other in the optical assembly 40 such that when the optical assembly 40 is oriented relative to the laser beam 5 such that the first surface 51 of the optical element is substantially perpendicular to the polarization plane 19 and the laser beam 5 is incident on the first surface 51 at substantially Brewster's angle, the laser beam 5 is incident on the partially reflective surface 8 with a desired angle of incidence $\theta_i$ and polarization angle $\alpha_p$. For example, the laser beam 5 may be incident on the partially reflective surface 8 with an angle of incidence and $\theta_i$ and polarization angle $\alpha_p$ at which the fraction of the laser beam 5 which forms the reflected portion 9 is substantially invariant with changes in the refractive index $n_2$ of the partial reflector 7, the refractive index of the optical element 42 and/or changes in a thickness of a contamination layer which is disposed on any of the surfaces of the optical element 42 or the partial reflector 7.

The relative orientation of the optical element 42 and the partial reflector 7 in the optical assembly 40 may be fixed. For example, the optical element 42 may comprise an optical mount which may hold the optical element 42 and the partial reflector 7 and fix their orientation relative to each other.

Fixing the relative orientation of the optical element 42 and the partial reflector 7 in an optical assembly 40 may allow for easy orientation of the partial reflector 7 relative to the laser beam 5. For example, the optical assembly 40 may be placed in the path of the laser beam 5 and any reflection of the laser beam 5 from the optical element 42 may be measured or observed. The orientation of the optical assembly 40 as a whole may then be adjusted until any reflection of the laser beam 5 from the optical element 42 reaches a minimum. The reflection of the laser beam 5 from the optical element 42 being at a minimum may indicate that the first surface 51 and/or the second surface 52 is oriented at Brewster's angle relative to the laser beam 5. If the optical element 42 and the partial reflector 7 are correctly oriented and fixed relative to each other in the optical assembly 40 then the first surface 51 and/or the second surface 52 being oriented at Brewster's angle results in the laser beam 5 being incident on the partially reflective surface 8 with a desired angle of incidence $\theta_i$ and a desired polarization angle $\alpha_p$.

The optical assembly 40 or a mount which holds the optical assembly 40 may, for example, have a flat base. The optical assembly 40 or the mount may be easily adjustable by translation and/or rotation in a plane defined by the flat surface. The partial reflector 7 may be arranged in the optical assembly 40 such that the partially reflective surface 8 of the partial reflector 7 is tilted with respect to the flat base of the optical assembly 40 and is not perpendicular to the flat base. The optical element 42 of the optical assembly 40 may be oriented such that the first and second surfaces 51, 52 of the optical element are perpendicular to the flat base. The flat base of the optical assembly 40 may be positioned on a flat surface (e.g. a horizontal surface) which is parallel with the propagation direction and the polarization plane of the laser beam 5. The orientation of the optical element 42 and the partial reflector 7 relative to the flat base of the optical assembly 40 may ensure that when the optical assembly is placed on the flat surface which is parallel to the propagation direction of the laser beam 5, the first and second surfaces 51, 52 of the optical element 42 are perpendicular to the plane of polarization of the laser beam 5 and the partially reflective surface 8 is oriented relative to the plane of polarization with a desired polarization angle $\alpha_p$. The optical assembly 40 may then be rotated as a whole until the laser beam 5 is incident on the first surface 51 and/or the second surface 52 of the optical element 42 at Brewster's angle. As was described above, orienting the first surface 51 and/or the second surface 52 at Brewster's angle results in the laser beam 5 being incident on the partially reflective surface 8 with a desired angle of incidence $\theta_i$.

In some embodiments of the optical assembly 40 the first and second surfaces 51, 52 of the optical element 42 and the partially reflective surface 8 may be approximately parallel to each other. Such an embodiment of the optical assembly 40 may, for example, be relatively simple to manufacture. However in an embodiment in which the first and second surfaces 51, 52 and the partially reflective surface 8 are parallel to each other, the first and second surfaces 51, 52 are not oriented at Brewster's angle when the partially reflective surface 8 is arranged at a desired angle of incidence $\theta_i$ and polarization angle $\alpha_p$. The polarization state of the laser beam 5 which is incident on the partially reflective surface may therefore be altered by the reflectivity of the first and second surfaces of the optical element 42. In such embodiments, a desired orientation of the partially reflective surface 8 may be calculated by taking into account the reflectivity of the first and second surfaces of the optical element 42, to both the laser beam 5 which is incident on the optical element 42 and the reflected portion 9 which is transmitted back through the optical element 42, at different values of the angle of incidence $\theta_i$ and polarization angle $\alpha_p$.

The components of the optical assembly 40 may be thoroughly cleaned before being assembled into the optical assembly 40 in order to reduce the amount of any contamination in the sealed chamber 46. The components of the optical assembly 40 may be held together with a glue. The glue may, for example, have a relatively low Young's modulus such as less than about 600 MPa, less than about 300 MPa or less than about 100 MPa. This may reduce any stress which may be induced in the optical element 42 and/or the partial reflector 7. Reducing any stress in the optical element 42 and/or the partial reflector 7 may reduce any depolarization of the laser beam 5 which may occur due to stress induced birefringence in the optical element 42 and/or the partial reflector 7. A glue may also be chosen which has relatively low outgassing properties in order to reduce the exposure of optical surfaces to contamination. For example, an ultraviolet curing glue may be used which has both a relatively low Young's modulus and relatively low outgassing properties.

In some embodiments one or more polarizers may be positioned in the path of the laser beam 5 before the laser beam 5 is incident on the partially reflective surface 8. The one or more polarizers may be configured to remove any radiation in the laser beam 5 which is not polarized in a desired polarization plane 19. For example, the laser beam 5 may undergo some depolarization (e.g. due to passing through one or more birefringent materials) on its path to the optical assembly 40. One or more polarizers may remove the effects of any depolarization of the laser beam 5 and may ensure that substantially all of the radiation which is incident on the partially reflective surface 8 is polarized in the desired polarization plane 19. In some embodiments one or more polarizers may form part of the optical assembly 40. For example, a thin film polarizer may be disposed on the first and/or second surfaces 51, 52 of the optical element.

It should be appreciated that the optical element 42 of the optical assembly 40 may act as a partial polarizer. For example, in an embodiment in which the first surface 51 and/or the second surface 52 of optical element is arranged perpendicular to the plane of polarization 19 of the laser beam 5 and at Brewster's angle substantially none of a p-polarized component of the laser beam 5 will be reflected by the optical element 42 whereas a fraction of a component of the laser beam 5 which is s-polarized may be reflected by the optical element 42. The optical element 42 may therefore serve to partially polarise the laser beam 5 which is incident on the partial reflector 7.

The laser 3 may emit radiation in a narrow wavelength range which forms the majority of the radiation in the laser beam 5. However some lasers (e.g. a frequency doubled laser) may also emit radiation which has a wavelength outside of the narrow wavelength range. This radiation may, for example, have a component which has an orthogonal polarization to the polarization plane 19 and may therefore contain a significant s-polarized component at the partially reflective surface 8. Since the reflectance of the partially reflective surface 8 is higher for s-polarized radiation than p-polarized radiation, the radiation which is outside of the narrow wavelength range may contribute significantly to the reflected portion 9. Additionally a sensor 11 which is arranged to measure the power of the reflected portion 9 may be more sensitive to radiation which has a wavelength which is outside of the narrow wavelength range than radiation which has a wavelength which is inside the narrow wavelength range. Radiation which has a wavelength which is outside of the narrow wavelength range may therefore have a significant effect on a measurement of the power of the reflected portion 9. It may therefore be desirable to separate this radiation from the laser beam 5 before the laser beam 5 is incident on the partially reflective surface such that it does not form part of the reflected portion 9. In some embodiments of the optical assembly 40, the first surface 51 and/or the second surface 52 of the optical element 42 may, for example, be coated with a coating which is configured to reflect or absorb radiation having a wavelength which is outside of the narrow wavelength range. A coating which is configured to reflect radiation having a wavelength which is outside of the narrow wavelength range may, for example, comprise a dielectric stack coating. This may serve to reflect a component of the laser beam 5 which has a wavelength which is outside of the narrow wavelength range into the first reflected sub-portion 61 and/or the second reflected sub-portion 62 before the laser beam 5 is incident on the partially reflective surface 8. Alternatively a coating which is configured to absorb radiation having a wavelength which is outside of the narrow wavelength range may be used. However an absorbing coating may disadvantageously lead to heating of the coating.

Embodiments of an optical assembly 40 have been described above in which a reflected portion 9 is reflected from a partially reflective surface 8 which forms the third surface of the optical assembly 40 on which the laser beam 5 is incident. However it will be appreciated that other surfaces of an optical assembly 40 may be used as the partially reflective surface from which the reflected portion 9 is formed. For example, in some embodiments the second reflected sub-portion 62 which is reflected from the second surface 52 of the optical element 42 may be used as the reflected portion 9 which may, for example, be directed to a sensor 11. In such embodiments the second surface 52 may be arranged at an angle of incidence $\theta_i$ and a polarization angle $\alpha_p$ at which the fraction of the laser beam 5 which forms the second reflected sub-portion 62 is substantially invariant to changes in the refractive index of the optical element 42. The second surface 52 of the optical element 42 forms part of the sealed chamber 46 and is therefore protected from contamination by the sealed chamber 46. In such an embodiment it may be advantageous to orient other surfaces of the optical assembly (such as the partially reflective surface 8) such that the plane of incidence at each surface lies in the plane of polarization and such that the laser beam 5 is incident on the surfaces substantially at Brewster's angle. This may reduce any reflection which occurs at the surfaces and may therefore reduce the radiation which is lost from the transmitted portion 13 of the laser beam 5.

Figure 11:
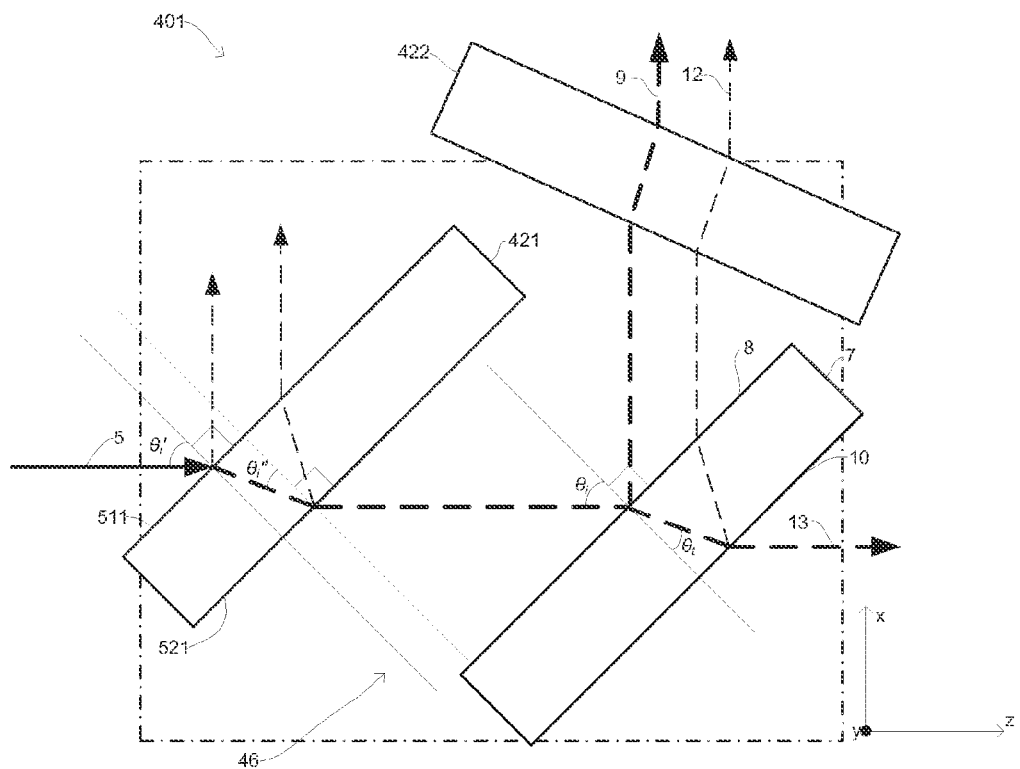
FIG. 11 is a schematic illustration of an optical assembly according to an alternative embodiment of the invention.

In some embodiments an optical assembly may comprise more components than the components of the optical assembly 40 which is depicted in FIG. 10. FIG. 11 is a schematic illustration of an optical assembly 401 which comprises a first optical element 421, a partial reflector 7 and a second optical element 422. The arrangement of the first optical element 421 and the partial reflector 7 may, for example, be similar to the arrangement of the optical element 42 and the partial reflector 7 of the embodiment which is depicted in FIG. 10. For example, a first surface 511 and a second surface 521 of the first optical element 421 may be arranged substantially perpendicular to the plane of polarization 19 of the laser beam 5. The first surface 511 and/or the second surface 521 of the first optical element 421 may be arranged such that the laser beam 5 is incident on them with angles of incidence and $\theta_i''$ and $\theta_i'''$ which are approximately equal to Brewster's angle at the first 511 and second 521 surfaces respectively. The first surface 511 and/or the second surface 521 of the first optical element 421 may, for example, be coated with a thin film polarizer which is configured to only transmit radiation which is polarized in a desired plane of polarization. It may, in particular, be advantageous to coat the second surface 521 of the first optical element 421 with a thin film polarizer since the second surface 521 is the last surface through which the laser beam 5 passes before being incident on the partial reflector 7. The laser beam 5 does not therefore pass through any optical elements between the second surface 521 of the first optical element 421 and the partial reflector 7 which may depolarise the laser beam 5 (e.g. due to birefringence effects) before it is incident on the partial reflector 7.

The partial reflector 7 comprises a partially reflective surface 8. The partially reflective surface 8 may be oriented and fixed relative to the first optical element 421 such that when the first surface 511 of the first optical element 421 is substantially perpendicular to the polarization plane 19 and the laser beam 5 is incident on the first surface 51 at substantially Brewster's angle, the laser beam 5 is incident on the partially reflective surface 8 with a desired angle of incidence $\theta_i$ and polarization angle $\alpha_p$. For example, the laser beam 5 may be incident on the partially reflective surface 8 with an angle of incidence and $\theta_i$ and polarization angle $\alpha_p$ at which the fraction of the laser beam 5 which forms a reflected portion 9 is substantially invariant with changes in the refractive index $n_2$ of the partial reflector 7 and/or the refractive index of the first optical element 421 and/or the refractive index of the second optical element 422. Any reflection of the laser beam 5 from the first surface 511 of the first optical element 421 may be measured or observed in order to orient the optical assembly 401 relative to the laser beam 5. For example, the orientation of the optical assembly 401 may be adjusted until there is substantially no reflection of the laser beam 5 from the first surface 511 which may indicate that the first surface 511 is perpendicular to the plane of polarization and oriented substantially at Brewster's angle. This may indicate that the partial reflector of the optical assembly 401 is at a desired orientation with respect to the laser beam 5.

In an embodiment in which the first surface 511 of the first optical element 421 is coated (e.g. with a thin film polarizer) then there may not be a Brewster's angle at which substantially no p-polarized radiation is reflected from the first surface 511. A coating such as a thin film polarizer may, for example, be configured for an angle of incidence of the laser beam 5 on the coating of approximately 45°. In some embodiments in which the first surface 511 is coated, the first surface 511 may therefore be oriented relative to the laser beam 5 such that the laser beam 5 is incident on the first surface 511 at an angle of incidence of approximately 45°. The partially reflective surface 8 may be oriented and fixed relative to the first surface 511 such that when the laser beam 5 is incident on the first surface at an angle of approximately 45° then the laser beam 5 is incident on the partially reflective surface 8 at a desired angle of incidence $\theta_i$ and a desired polarization angle $\alpha_p$.

As was described above in an embodiment in which the first surface 511 is coated there may not be a Brewster's angle at which substantially no p-polarized radiation is reflected from the first surface 511. In such embodiments it may not therefore be possible to orient the optical assembly 420 relative to the laser beam 5 by adjusting the orientation of the optical element 420 until there is substantially no reflection from the first surface 511 since no such orientation may exist. Instead the optical assembly 420 may, for example, be oriented relative to the laser beam 5 by measuring or observing the position of a portion of the laser beam 5 which is reflected from the first surface 511 and adjusting the orientation of the optical assembly until the portion of the laser beam 5 which is reflected from the first surface 511 is at a desired position.

The second optical element 422 is positioned to receive and transmit the reflected portion of the laser beam 5 which is reflected from the partially reflective surface 8. The second optical element 422 may, for example, be arranged so as reduce any loss from the reflected portion 9 which is transmitted by the second optical element 422. One or more of the surfaces of the second optical element 422 may, for example, be coated with an anti-reflection coating which may reduce any reflection from the second optical element 422.

The reflected portion 9 which is transmitted through the second optical element 422 may be directed to a sensor 11. The second optical element 422 may also transmit a second reflected portion 12 which may be reflected from a second surface 10 of the partial reflector 7.

In any of the embodiments of FIGS. 3, 10, 11 and 12 it may be desirable to prevent a second reflected portion 12 from reaching the sensor 11 and from interfering with the reflected portion 9. The second reflected portion 12 may, for example, be blocked before the sensor 11. In some embodiments the thickness of the partial reflector 7 may be sufficient that the reflected portion 9 and the second reflected portion 12 are sufficiently separated that the second reflected portion 12 may be blocked without blocking the reflected portion 9. In some embodiments the partially reflective surface 8 and the second surface 10 of the partial reflector may be arranged such that they are not parallel with each other. This may cause the reflected portion 9 and the second reflected portion 12 to propagate in different directions such that they become separated from each other.

In the arrangement of an optical assembly 401 which is depicted in FIG. 11 the first optical element 421 which transmits the laser beam prior to the laser beam 5 being incident on the partial reflector 7 is independent of the second optical element 422 which transmits the reflected portion 9 which is directed to a sensor 11. This advantageously allows, for example, the optical properties of the first optical element 421 to be independently tuned without affecting the transmission of the reflected portion 9. For example, the first optical element 421 may be provided with a thin film polarizer without affecting the transmission of the reflected portion 9. The optical properties of the second optical element 422 may also be independently tuned without affecting the laser beam 5 which is incident on the partial reflector 7. For example, the second optical element 422 may be oriented such the reflected portion 9 is incident on the second optical element 422 at an angle which is close to normal incidence. This may reduce any difference between the transmittance of the second optical element 422 to s and p-polarized components of the reflected portion 9.

The first optical element 421, the second optical element 422 and the partial reflector 7 may be arranged to form a sealed chamber 46 between them (the sealed chamber 46 is shown schematically in FIG. 11 with a dash-dot line). For example, the first optical element 421, the second optical element 422 and the partial reflector 7 may be arranged on an optical mount which seals a volume between them from the external environment. This may reduce an amount of contamination which may be deposited onto the partially reflective surface 8. The amount of contamination which is sealed in the chamber 46 may be reduced by reducing the volume of the chamber 46. The volume of the sealed chamber 46 may, for example, be less than approximately 1 cubic centimeter. In some embodiments the volume of the sealed chamber 46 may be less than approximately 0.2 cubic centimeters.

In some embodiments the amount of contamination which is sealed in the chamber 46 may be reduced by reducing the total surface area of the internal surfaces of the sealed chamber 46. The total surface area of the internal surfaces of the sealed chamber 46 may, for example, be less than about 5 $cm^2$, less than about 2 $cm^2$, less than about 1 $cm^2$ or less than about 0.5 $cm^2$.

In some embodiments which include a sealed chamber 46, the chamber 46 may be purged so as to remove gas from the chamber 46. For example, a valve or sealable opening may be provided in the chamber 46 in order to allow the chamber 46 to be purged. This may allow the chamber 46 to be pumped to vacuum conditions. Alternatively a given gas or mixture of gases may be added to the chamber 46. The gas or gasses may include inert gasses. The gas or gasses may include oxygen. In some embodiments the composition and/or the pressure of the gas in the chamber 46 may be controlled.

In some embodiments a material which may be referred to as a particle getter may be positioned inside the chamber. The particle getter may collect particles thereby reducing particulate matter which is present in gasses in the chamber in order to reduce an amount of contamination which may be deposited on the partially reflective surface 8.

A transmitted portion 13 of the laser beam 5 is transmitted by the partial reflector 7. The components of the optical assembly 401 may, for example, be arranged in order to reduce a deviation of the path of the laser beam 5 through the optical assembly 401 to form the transmitted portion 13. For example, in some embodiments it may be desirable for the transmitted portion 13 to propagate in substantially the same direction as the laser beam 5 which is incident on the optical assembly and it may be desirable for the transmitted portion 13 to be substantially aligned with the laser beam 5 which is incident on the optical assembly 401.

Figure 12:
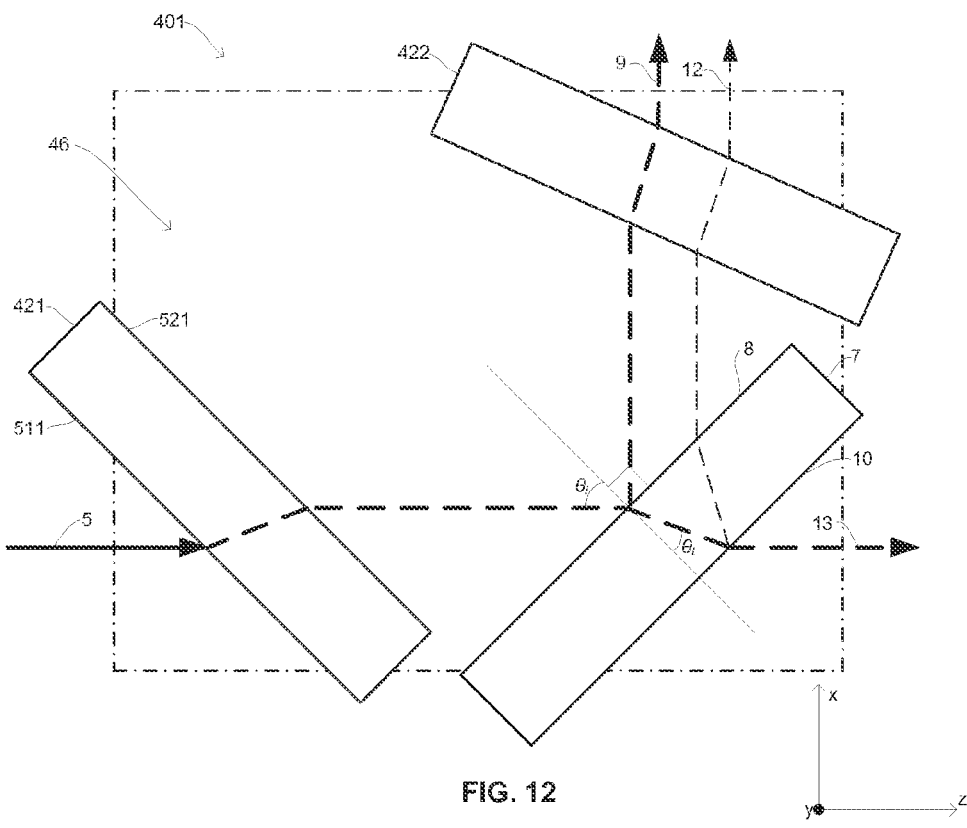
FIG. 12 is a schematic illustration of an optical assembly according to a further alternative embodiment of the invention.

FIG. 12 is a schematic illustration of an alternative embodiment of the optical assembly 401 which is arranged such that the transmitted portion 13 is substantially aligned with the laser beam 5 which is incident on the optical assembly 401. The first optical element 421 is arranged such that the laser beam 5 is displaced in the positive x-direction which is shown in FIG. 12 but continues to propagate in substantially the same direction as the laser beam 5 which is incident on the first optical element 421. The partial reflector 7 is arranged such that the laser beam 5 is displaced in the negative x-direction and continues to propagate in substantially the same direction.

The magnitude of the displacement of the laser beam 5 in the negative x-direction which is caused by the partial reflector 7 may be approximately the same as the magnitude of the displacement of the laser beam 5 in the positive x-direction which is caused by the first optical element 421 such that the transmitted portion 13 is substantially aligned with the laser beam 5 which is incident on the first optical element 421.

Whilst the optical assembly 401 which is depicted in FIG. 12 is described as being arranged such that the transmitted portion 13 is substantially aligned with the laser beam 5 which is incident on the optical assembly 401, it should be appreciated that the optical assembly 401 may bring about a small change in the position and/or the propagation direction of the transmitted portion 13 relative to the laser beam 5 which is incident on the optical assembly 401. For example, there may be a small difference between the angle of incidence with which the laser beam 5 is incident on the first optical element 421 and the angle of incidence $\theta_i$ with which the laser beam 5 is incident on the partially reflective surface. This may cause the magnitude of the displacement in the positive x-direction which is caused by the first optical element 521 to be slightly different to the magnitude of the displacement in the negative x-direction which is caused by the partial reflector 7. Additionally or alternatively the partial reflector 7 may be tilted with respect to the y-axis such that the partial reflector 7 causes the transmitted portion 13 to propagate at a small angle with respect to the x-z plane.

Several embodiments of partial reflectors and optical assemblies have been described above and depicted in the figures which are configured to reflect a portion of a laser beam 5 to form a reflected portion 9 which may be directed to a sensor 11. Any of the embodiments may include additional components to those which have been described and depicted. For example, one or more polarizers (e.g. thin film polarizers) may be positioned in the path of the laser beam 5 before it is incident on a partially reflective surface 8.

In some embodiments one or more surfaces of optical elements and/or partial reflectors which do not form a reflected portion 9 which is directed to a sensor may be coated with an anti-reflection coating. An anti-reflection coating may reduce an amount of radiation which is lost from the laser beam due to reflection from surfaces of optical elements and/or partial reflectors. An anti-reflection coating may also reduce reflected sub-beams which may disadvantageously interfere with a reflected portion 9 which may be directed to a sensor 11. Additionally or alternatively interference between a reflected portion 9 and one or more reflected sub-beams may be reduced by orienting surfaces of a partial reflector and/or an optical element such that they are not parallel with each other and reflections from different surfaces propagate in different directions. Additionally or alternatively interference between a reflected portion 9 and one or more reflected sub-beams may be reduced by blocking one or more sub-beams.

In some embodiments one or more surfaces of optical elements and/or partial reflectors may be coated with a coating which separates radiation having a wavelength in one or more predetermined wavelength ranges from the laser beam 5. For example, a short-pass optical filter, a long-pass optical filter and/or a notch filter may be disposed on one or more surfaces of an optical element and/or a partial reflector 7.

Whilst the embodiments of a partial reflector have been described as comprising a partially reflective surface which is uncoated, in some embodiments the partially reflective surface may be coated. A coating on the partially reflective surface may affect the optical properties of the partially reflective surface. An orientation of the partially reflective surface which causes a desired invariance of a fraction of a laser beam which is reflected from the partially reflective surface with respect to changes in the refractive index of the partial reflector and/or in the thickness of a layer of contamination on the partially reflective surface may therefore be different to an equivalent orientation for an uncoated partially reflective surface. For a known coating on a partially reflective surface an angle of incidence and a polarization angle may be calculated at which a change in the refractive index of the partial reflector and/or a change in the thickness of a layer of contamination causes a change in an amount of p-polarized radiation which is reflected from the partially reflective surface which is substantially equal and opposite in sign to a change in an amount of s-polarized radiation which is reflected from the partially reflective surface. A fraction of the laser beam which is reflected from the coated surface may therefore be substantially invariant to changes in the refractive index of the partial reflector and/or to changes in the thickness of a contamination layer.

In addition to the reflection and transmission of the laser beam 5 from surfaces of an optical element and/or a partial reflector which has been described above, some radiation may be scattered from surfaces of an optical element and/or partial reflector. For example, contamination which may become deposited on surfaces of an optical element and/or partial reflector may cause radiation from the laser beam 5 to be scattered by the contamination. It may be desirable to prevent scattered radiation from reaching a sensor 11 in order to prevent the scattered radiation from affecting a measurement of a reflected portion 9 which may be made by the sensor 11. The sensor 11 may, for example, be placed at a sufficient distance away from any surfaces from which radiation may be scattered such that only insignificant amounts of scattered radiation may reach the sensor 11. Additionally or alternatively one or more screens may be positioned to block scattered radiation from reaching a sensor 11. An aperture may be formed in one or more screens in order to allow a reflected portion to pass through the aperture and to the sensor 11. This may ensure that the sensor only receives radiation which is reflected in a given solid angle and may reduce any scattered radiation which reaches the sensor 11. A reflected portion 9 may, for example, be focussed through an aperture which may allow the size of the aperture to be reduced thereby further reducing any scattered radiation which may reach the sensor 11.

Embodiments have been described above in which a fraction of a laser beam which is reflected and directed to a sensor is substantially invariant with changes in the refractive index $n_2$ of a partial reflector 7 from which the fraction of the laser beam is reflected. Embodiments have been also been described in which the reflected fraction is substantially invariant with changes in the thickness of a contamination layer which is disposed on a partially reflective surface 8 from which the fraction of the laser beam is reflected. In some embodiments the reflected fraction may be substantially invariant with changes in both the refractive index $n_2$ of the partial reflector 7 and the thickness of a contamination layer which is disposed on the partially reflective surface 8.

Both the temperature (which affects the refractive index $n_2$ of the partial reflector 7) and the thickness of a contamination layer which is disposed on the partially reflective surface 8 may be considered to be examples of environmental factors which may change over time (e.g. due to changes in environmental conditions and/or in exposure to contamination). In general the fraction of a laser beam which is reflected from a partially reflective surface and which is output to be directed to a sensor may be invariant with changes in at least one environmental factor. The at least one environmental factor may include the temperature (which affects the refractive index $n_2$ of the partial reflector 7). Additionally or alternatively the at least one environmental factor may include the thickness of a contamination layer which is disposed on the partially reflective surface 8. The thickness of the contamination layer may, for example, be affected by the presence of contaminant material and/or gasses in which contaminant is suspended.

Embodiments have been described above in which a fraction of a laser beam 5 is reflected from partially reflective surface 8 of a partial reflector 7 and directed to a sensor 11. In some embodiments the partially reflective surface 8 is positioned within a sealed chamber 46 and the fraction of the laser beam 5 which is reflected from the partially reflective surface is transmitted out of the sealed chamber 46 and directed to a sensor 11. It will be appreciated that it is the invariance of the fraction of the laser beam (with changes in at least one environmental factor) which is directed to a sensor which is advantageous. For example, in an embodiment in which the partially reflective surface 8 is positioned within a sealed chamber, the fraction of the laser beam which is reflected at the partially reflective surface 8 may not be invariant with changes in at least one environmental factor but the fraction of the laser beam which is reflected and which is output from the sealed chamber is invariant with changes in at least one environmental factor.

In general a laser beam 5 is directed to be incident on an optical assembly which comprises a partial reflector. The partial reflector comprises a partially reflective surface which is arranged to reflect a portion of the laser beam such that the reflected portion is output from the optical assembly. The fraction of the laser beam which is reflected from the partially reflective surface and which is output from the optical assembly is substantially invariant with changes in at least one environmental factor. In some embodiments the optical assembly may consist only of the partial reflector and the fraction of the laser beam which is output from the optical assembly may be the same as the fraction of the laser beam which is reflected by the partial reflector. In other embodiments the optical assembly may comprise other optical components and the fraction of the laser beam which is output from the optical assembly may be different to the fraction of the laser beam which is reflected by the partial reflector. For example, the fraction of the laser beam which is reflected by the partial reflector may be transmitted by one or more optical elements before being output from the optical assembly. The one or more optical elements may not transmit all of the reflected portion of the laser beam such that the fraction of the laser beam which is output from the optical assembly is altered by the one or more optical elements. In such embodiments the fraction of the laser beam which is reflected by the partially reflective surface and which is transmitted by the one or more optical elements (such that it is output from the optical assembly) is substantially invariant with changes in at least one environmental factor.

Whilst reference has been made above to a laser beam 5 which is linearly polarized, it will be appreciated that in practice a laser beam 5 which is described as linearly polarized may not be perfectly linearly polarized. For example, the laser beam 5 may include a component which has a different polarization state to the majority of the laser beam 5. In general any reference to a linearly polarized laser beam 5 may, for example, be understood to mean a laser beam of which more than about 95% of the laser beam is linearly polarized. In some circumstances more than about 99% of the laser beam may be linearly polarized. In some circumstances more than about 99.9% of the laser beam may be linearly polarized.

While specific embodiments of the invention have been described above, it will be appreciated that the invention may be practiced otherwise than as described. The descriptions above are intended to be illustrative, not limiting. Thus it will be apparent to one skilled in the art that modifications may be made to the invention as described without departing from the scope of the appended claims.

The invention claimed is:
1. A laser system comprising:
a laser configured to emit a laser beam wherein the laser beam is linearly polarized in a polarization plane; and
an optical assembly comprising a partial reflector having a refractive index and comprising a partially reflective surface, wherein:
the partially reflective surface is arranged to receive the laser beam at an angle of incidence which lies in a plane of incidence and reflect a portion of the laser beam such that the reflected portion is output from the optical assembly;
the partially reflective surface is arranged such that the plane of incidence forms a polarization angle with the polarization plane of the laser beam and the laser beam includes a p-polarized component and an s-polarized component;
the angle of incidence and the polarization angle are arranged such that a fraction of the laser beam which is output from the optical assembly, following reflection from the partially reflective surface, is substantially invariant with changes in at least one environmental factor selected from the group consisting of the temperature of the partial reflector and a thickness of a contamination layer disposed on the partially reflective surface;
the partially reflective surface is arranged to reflect the fraction of the laser beam which is greater than or equal to 0.5% of the laser beam which is incident on the partially reflective surface; and
the angle of incidence and the polarization angle are arranged such that in the event of a change in the at least one environmental factor a resulting change in an amount of p-polarized radiation which is output from the optical assembly is substantially equal and opposite in sign to a resulting change in an amount of s-polarized radiation which is output from the optical assembly.

2. The laser system of claim 1, wherein the partially reflective surface is arranged to reflect the fraction of the laser beam which is greater than or equal to 1% of the laser beam which is incident on the partially reflective surface.

3. The laser system of claim 1, wherein the polarization angle is greater than or equal to 10 degrees.

4. The laser system of claim 1, wherein the angle of incidence is greater than or equal to 3 degrees more than Brewster's angle.

5. The laser system of claim 1, further comprising a polarizer arranged in the path of the laser beam before the laser beam is incident on the partial reflector and configured to only transmit radiation having a polarization which lies in the polarization plane.

6. The laser system of claim 5, wherein the polarizer comprises a thin film polarizer arranged immediately upstream of the partial reflector such that the laser beam does not pass through any element other than a gas in its path between the thin film polarizer and the partial reflector.

7. The laser system of claim 1, wherein the partial reflector comprises a second surface and wherein the second surface is not parallel with the partially reflective surface.

8. The laser system of claim 1, wherein the partial reflector comprises fused silica or borosilicate crown glass.

9. The laser system of claim 8, wherein the angle of incidence is greater than 54 degrees and less than 56 degrees, and wherein the polarization angle is greater than 8 degrees and less than 12 degrees.

10. The laser system of claim 1, wherein the partial reflector comprises yttrium aluminium garnet and wherein the angle of incidence is greater than 62 degrees and less than 64 degrees and wherein the polarization angle is greater than 7 degrees and less than 11 degrees.

11. The laser system of claim 1, wherein the partially reflective surface is sealed from an external environment.

12. A laser system comprising:
a laser configured to emit a laser beam wherein the laser beam is linearly polarized in a polarization plane; and
an optical assembly comprising:
an optical element configured to receive the laser beam and transmit at least a portion of the laser beam; and
a partial reflector having a refractive index and comprising a partially reflective surface which is sealed from an external environment, wherein:
the partially reflective surface is arranged to receive the transmitted laser beam at an angle of incidence which lies in a plane of incidence and reflect a portion of the laser beam out of the optical assembly;
the partially reflective surface is arranged such that the plane of incidence forms a polarization angle with the polarization plane of the transmitted laser beam and the laser beam includes a p-polarized component and an s-polarized component; and
the angle of incidence and the polarization angle are arranged such that a fraction of the laser beam which is reflected out of the optical assembly is substantially invariant with changes in at least one environmental factor selected from the group consisting of the temperature of the partial reflector and a thickness of a contamination layer disposed on the partially reflective surface; and
the angle of incidence and the polarization angle are arranged such that in the event of a change in the at least one environmental factor a resulting change in an amount of p-polarized radiation which is reflected out of the sealed chamber is substantially equal and opposite in sign to a resulting change in an amount of s-polarized radiation which is reflected out of the sealed chamber.

13. The laser system of claim 12, wherein the partially reflective surface and the optical element are arranged relative to each other such that when the optical assembly is oriented such that the optical element is substantially perpendicular to the polarization plane of the laser beam and the laser beam is incident on the optical element substantially at Brewster's angle, the angle of incidence and the polarization angle are arranged such that the fraction of the laser beam which is reflected out of the sealed chamber is substantially invariant with changes in the at least one environmental factor.

14. The laser system of claim 12, wherein the optical element and the partial reflector form a sealed chamber, and wherein the partially reflective surface is positioned in the sealed chamber and is arranged to receive the transmitted laser beam from the optical element and reflect a portion of the laser beam out of the sealed chamber such that it is output from the optical assembly.

15. The laser system of claim 14, wherein the sealed chamber has a volume of less than 1 cubic centimeter.

16. The laser system of claim 14, wherein the internal surfaces of the sealed chamber have a total surface area of less than 5 cm$^2$.

17. A method of reflecting a fraction of a laser beam comprising:
directing a laser beam to be incident on an optical assembly comprising a partial reflector having a refractive index and comprising a partially reflective surface, wherein the laser beam is linearly polarized in a polarization plane;
arranging the partially reflective surface to receive the laser beam such that the laser beam is incident on the partially reflective surface with an angle of incidence which lies in a plane of incidence and such that the plane of incidence forms a polarization angle with the polarization plane of the laser beam and the laser beam includes a p-polarized component and an s-polarized component and such that the angle of incidence and the polarization angle are arranged such that a fraction of the laser beam which is output from the optical assembly, following reflection from the partially reflective surface, is substantially invariant with changes in at least one environmental factor selected from the group consisting of the temperature of the partial reflector and a thickness of a contamination layer disposed on the partially reflective surface and such that the partially reflective surface reflects the fraction of the laser beam which is greater than or equal to 0.5% of the laser beam which is incident on the partially reflective surface;
wherein the angle of incidence and the polarization angle are such that in the event of a change in the at least one environmental factor a resulting change in an amount of p-polarized radiation which is output from the optical assembly is substantially equal and opposite in sign to a resulting change in an amount of s-polarized radiation which is output from the optical assembly.

* * * * *